United States Patent
Asahina et al.

(10) Patent No.: US 6,259,704 B1
(45) Date of Patent: Jul. 10, 2001

(54) DIGITAL TRANSMISSION NETWORK

(75) Inventors: Takashi Asahina, Kawasaki; Hiroyuki Hisatomi, Chofu; Suguru Hirono, Hachioji; Nobuo Murata, Musashino, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/839,227

(22) Filed: Apr. 23, 1997

(30) Foreign Application Priority Data

Apr. 23, 1996 (JP) .................................. 8-101104
Aug. 1, 1996 (JP) .................................. 8-203534
Sep. 30, 1996 (JP) .................................. 8-259054

(51) Int. Cl.$^7$ .................................. H04L 12/43
(52) U.S. Cl. .................. 370/460; 370/222; 359/119; 359/135; 359/157
(58) Field of Search .................. 370/221, 222, 370/223, 224, 458, 459, 460, 468; 348/13, 14, 15; 359/110, 115, 135, 154, 157, 118, 119

(56) References Cited

U.S. PATENT DOCUMENTS

| | | | |
|---|---|---|---|
| 3,879,710 | * 4/1975 | Maxemchuk et al. | 709/225 |
| 4,713,807 | * 12/1987 | Caves et al. | 370/460 |
| 4,937,823 | * 6/1990 | Bekki et al. | 714/4 |
| 5,101,405 | * 3/1992 | Bekki et al. | 370/407 |
| 5,477,542 | * 12/1995 | Takahara et al. | 370/389 |
| 5,495,285 | * 2/1996 | Fujioka | 348/15 |

* cited by examiner

Primary Examiner—Ajit Patel
Assistant Examiner—Bob A. Phunkulh
(74) Attorney, Agent, or Firm—Anonelli, Terry, Stout & Kraus, LLP

(57) ABSTRACT

A digital transmission network comprises a plurality of transmission terminals and receiving terminals, which are all connected with each other by a transmission line of a metal cable or optical fiber cable in the form of loop. Signals are transmitted by timeshare multiplexing in one direction. An individual time slot which is defined for each transmission terminal by time sharing multiplexing is allocated to each of all transmitted signals. A timing device is inserted into the loop for retransmitting a signal so that the delay time is corrected to the delay time of one frame including the delay time caused by the transmission line, cable and the like so that the consecutive frames are continuous. The transmission line is in single or dual loop. In case of the single loop, the transmission terminal includes a bypass circuit for bypassing a signal input to the transmission line if necessary. In case where the transmission line is in a dual loop comprising optical fiber cables of a working line and backup line, a control signal of loop-back is transmitted to all receiving terminals from a receiving terminal which serves as a central unit to bring all receiving terminals into a state enabling signals to be input from the optical fiber cable of the backup line. A control signal is transmitted which returns the receiving terminals into a state enabling signals to be input from the working line in order of proximity to the central unit for confirming that the receiving terminals are normally operating in order of proximity to the central unit.

5 Claims, 24 Drawing Sheets

DIGITAL TRANSMISSION NETWORK

BACKGROUND OF THE INVENTION

The present invention relates to a digital transmission network and in particular to a digital transmission network which is suitable for transmission of video, audio signals, etc. to monitor a plurality of monitor sites dispersed in a wide area through video and audio signals by devices in monitor centers which are provided in one or more locations, in which terminals each including a monitor device are provided in the plurality of monitor sites.

System configurations of conventional video transmission networks are shown in FIGS. 7 and 8. FIG. 7 shows a system configuration in which a plurality of cameras 71 and a plurality of monitors 72 are all disposed in a star configuration and are connected to a central unit 73 so that all connection and switching between the cameras and the monitors is carried out by a matrix switch in a central unit.

FIG. 8 shows a so-called LAN (local area network) configuration in which a plurality of cameras 81 and monitors 82 are all connected through terminals 83 and a communication control unit 84 in the form of loop so that connection and switching between the cameras and monitors is carried out.

In the system of FIG. 7, the monitor 72 and the central unit 73 are usually disposed in the same position although the cameras 71 are dispersed. In a large scale monitor system, the distances between the cameras and between the cameras and the central unit are often several kilometers to several tens of kilometers.

For further information on the technology related with the present application, reference may be made to U.S. Pat. Nos. 4,937,823 and 5,101,405.

If the monitor area is wide and the number of monitor sites is large in the system of FIG. 7, the amount of the transmission line would be increased, and the matrix switch in the central unit would have an increased capacity and become complicated.

In the system of FIG. 8, a so-called Ethernet, token ring, or other format in which a plurality of data are randomly superposed on a looped transmission line is often adopted. Since the rate of the data of the monitor cameras is remarkably larger in comparison with that of usual personal computer and the period of its connection occupation time is extended, a waiting time for connection may occur on congestion of data and the system may often be inappropriate for emergency monitor. In particular, in case where a number of video data are concentrated on occurrence of accident, the connection will be impossible.

SUMMARY OF THE INVENTION

It is an object of the present invention to provide a simplified configured system in which the above-mentioned drawbacks are eliminated and are increase in the amount of the transmission line is prevented from occurring and no waiting time occurs.

In order to accomplish the above-mentioned object, an aspect of the present invention provides a digital transmission network in which a plurality of cameras and monitors are all connected in the form of loop through a metal cable or optical fiber cable, in which signals are transmitted in one direction by time-sharing multiplexing, an individual time slot defined by the time sharing multiplexing is allocated to each of signals transmitted from transmission terminals, and a timing device is inserted in a loop for retransmitting sequential frames so that they are continuous by correcting the transmission time for one frame and the delay time caused by the transmission line and cable and the like.

As a result, a waiting time due to conflicts of connection requests and congestion on the transmission line will not occur. Further, the delay time caused in the transmission line and each terminal can be corrected and absorbed by the timing device. The timing device may be provided at the same place as the central unit or a given monitor.

A predetermined number of the time slots are provided in the frame signal. Accordingly, a predetermined transmission capacity of the video data is always assured. Therefore, undesirable events such as occurrence of the waiting time and unable connection due to data concentration can be avoided.

The number of the video channels should not necessarily be equal to the total of all cameras and may be the total of the cameras which should be connected in emergency. Since the central unit can desiredly specify the channel of the camera to be monitored, no waiting time occurs when a necessary camera is to be connected in emergency.

A camera which always requires connection may be fixedly allocated in a given time slot.

In the usual monitor system, the number of the monitors is less than that of the cameras. Accordingly, the number of time slots (the number of channels) which are accommodated in one frame signal may be not larger than that of the cameras or may be equal to that of the monitors.

The central unit can specify the priority of connection for the transmission terminal.

DESCRIPTION OF THE PREFERRED EMBODIMENTS

Now, an embodiment of the present invention will be described with reference to FIGS. 1 to 6.

Figure 1:
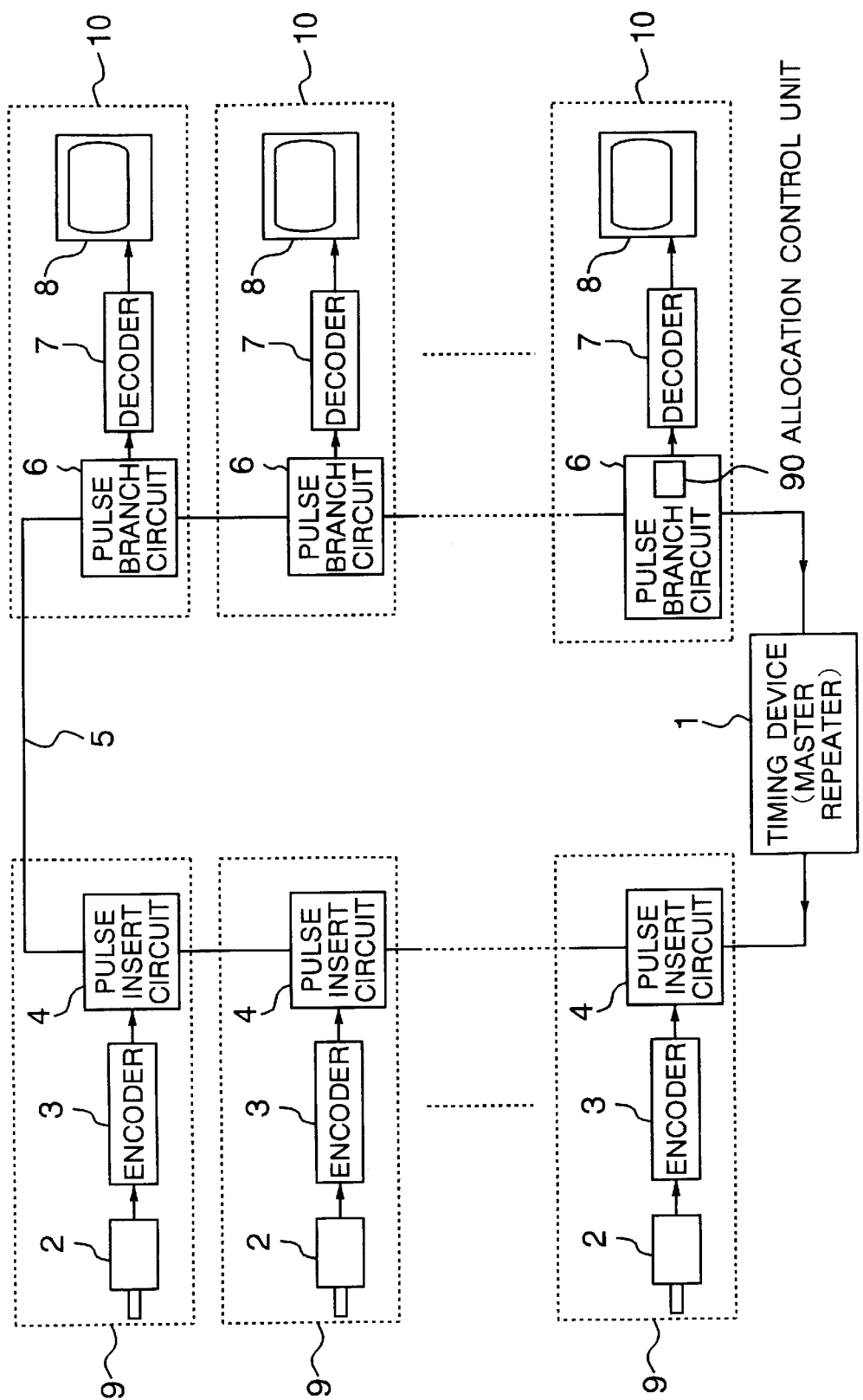
FIG. 1 is a block diagram showing the configuration of a system of an embodiment of the present invention.

FIG. 1 shows the configuration of the whole of the system. A plurality of transmission terminals and receiving terminals are connected in the form of loop. When the system is started up, a basic pulse pattern having a frame synchronization signal and various signals, etc. are transmitted to an optical fiber cable 5, for example, in a direction of, for example, an arrow in the drawing from a timing device(master repeater). The frame synchronization signal and various signals, etc. are formed in response to a clock signal generated by a clock generator. The master repeater 1 may be provided in any of the receiving terminals.

A slot having a predetermined timing relationship with said various signals is allocated to each signal transmission terminal 9. An video signal, etc. Whiz is digitally compressed is transmitted from each transmission terminal 9 for a period of time corresponding to the allocated time slot. In other words, a signal from each transmission terminal 9 is transmitted in a time-sharing multiplexing basis. At each signal receiving terminal 10, a signal of a slot having a predetermined timing relationship of slots of the transmission terminals 9 is received and used. The master repeater or any of the receiving terminals 10 has an allocation control unit 90 for desiredly allocating the transmission terminal to a slot.

The allocation control unit 90 allocates a vacant time slot to be used from a channel occupation state signal contained in network control data 203 in a frame pattern of FIG. 23 which will be explained hereafter to a pulse insert circuit 4 of the transmission terminal 9 to be monitored and inserts a video signal into the position of the vacant time slot. That is, the allocation control unit 90 serves to transmit its request signal from that signal receiving terminal 10 in which the same control unit is provided (note that the allocation control unit 90 is required to be provided in at least one signal receiving terminal 10) to a signal transmission terminal 9 having a requested video signal.

Figure 25:
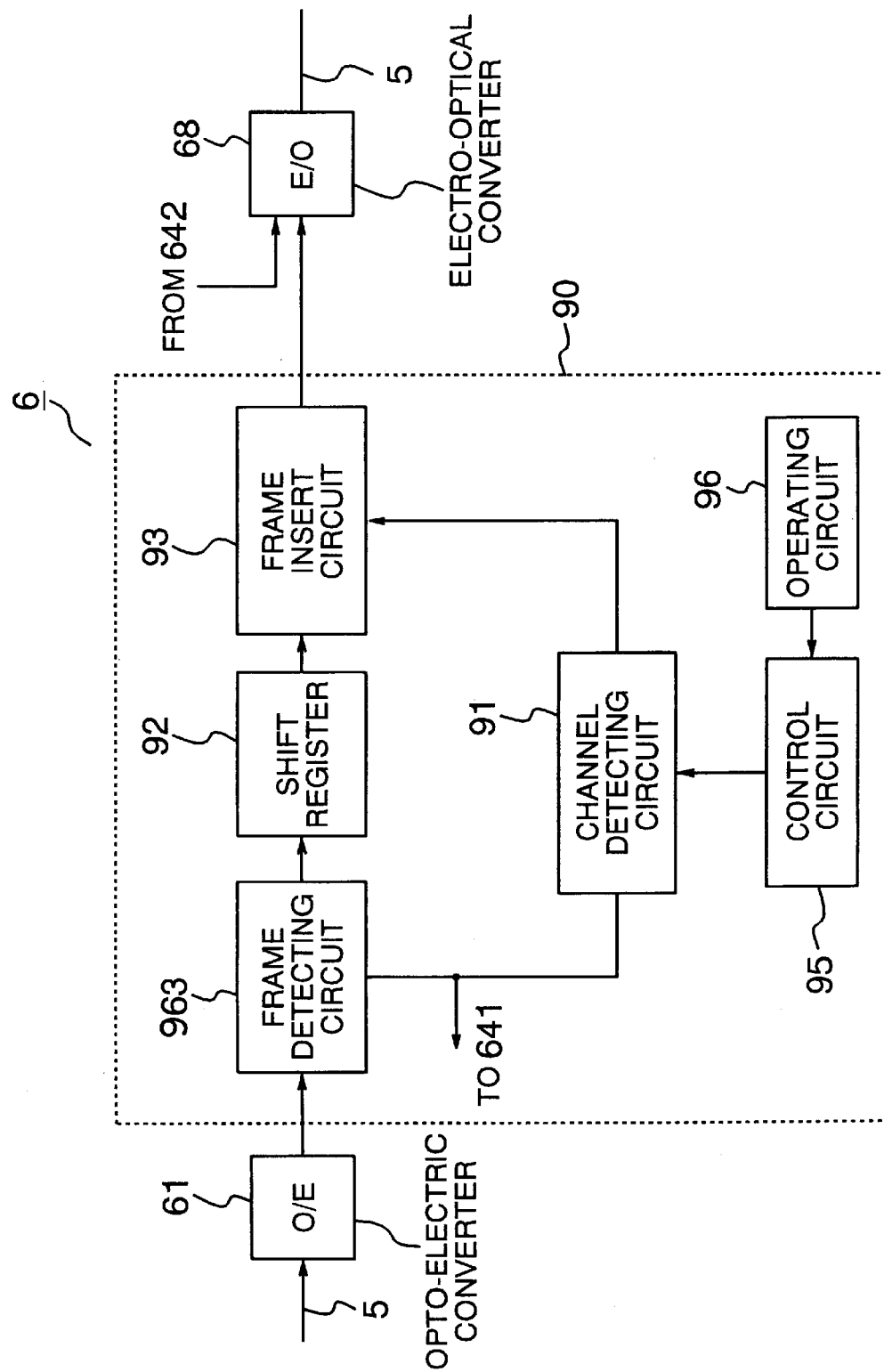
FIG. 25 is a block diagram showing the configuration of a allocation control unit.

A block diagram of the allocation control unit 90 is shown in FIG. 25. As shown in the figure, the allocation control unit 90 is located within a pulse branch circuit 6 of the signal receiving terminal 10. In operation, a frame detecting circuit 963 detects a frame and a channel information detecting circuit 91 detects a vacant channel and superposes a request signal used for inserting a video signal on a network control data. The frame detecting circuit 963 has a bit synchronization detection function which is comprised of the function of a bit synchronization detector 62 and the function of a frame synchronization detector 63 shown in FIG. 4 to be described later. A frame insert circuit 93 inserts a frame including the superposed control data and transmits it. At this time, each frame signal is delayed by a shift register 92 and this frame signal (i.e., the frame signal on which a request signal for inserting a video signal on said network control data is superposed) is inserted into a frame position which is detected by the frame detecting circuit 963. Designation of necessary transmission terminal, that is, a channel designation instruction to the channel information detecting circuit 91 is issued under control of a control circuit 95 and an operating unit 96. Reference numerals 61 and 68 denote opto-electric converting circuit and electro-optical converting circuits, respectively.

Figure 5:
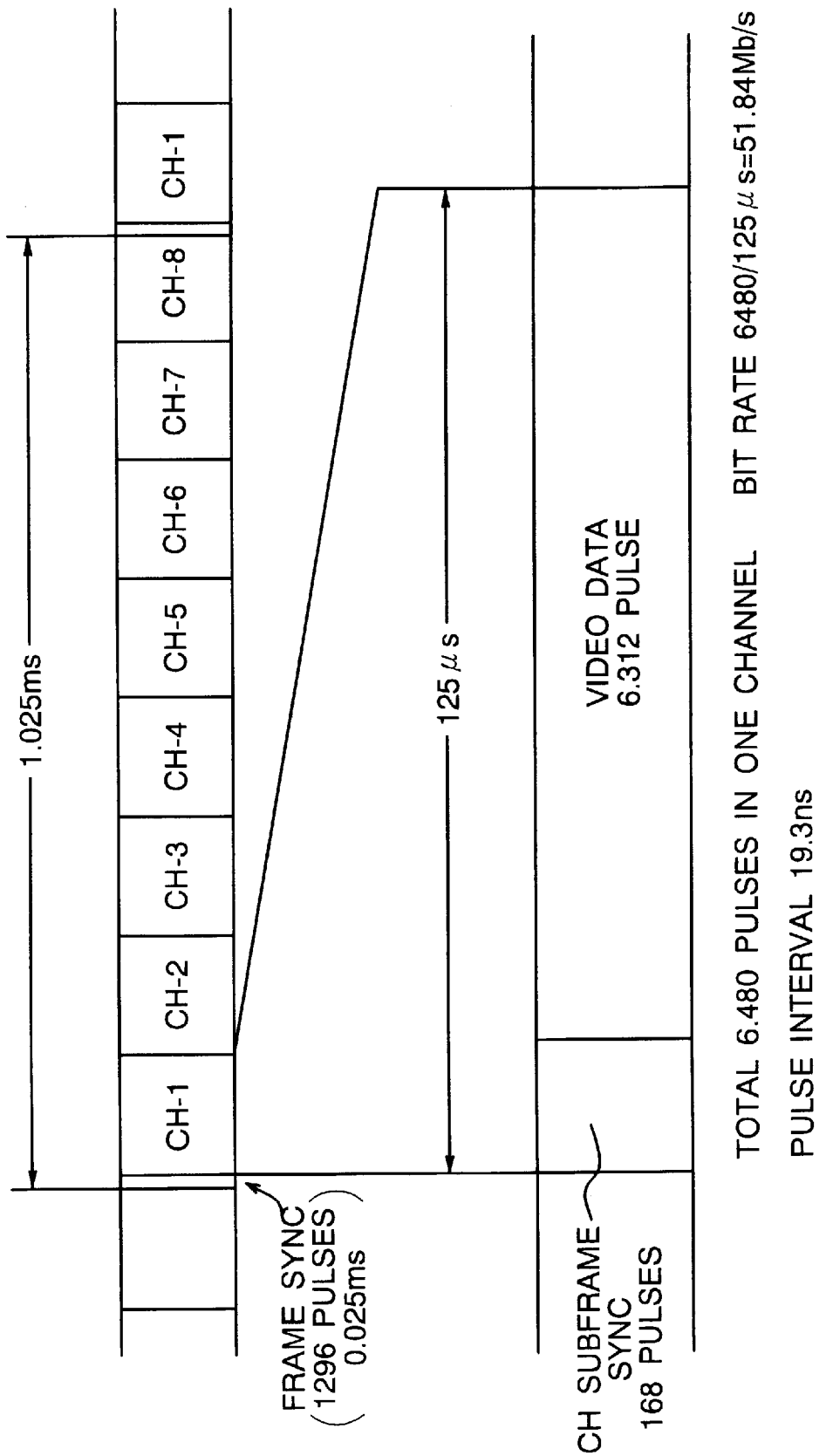
FIG. 5 is a block diagram showing a signal format of the present invention.
Figure 6:
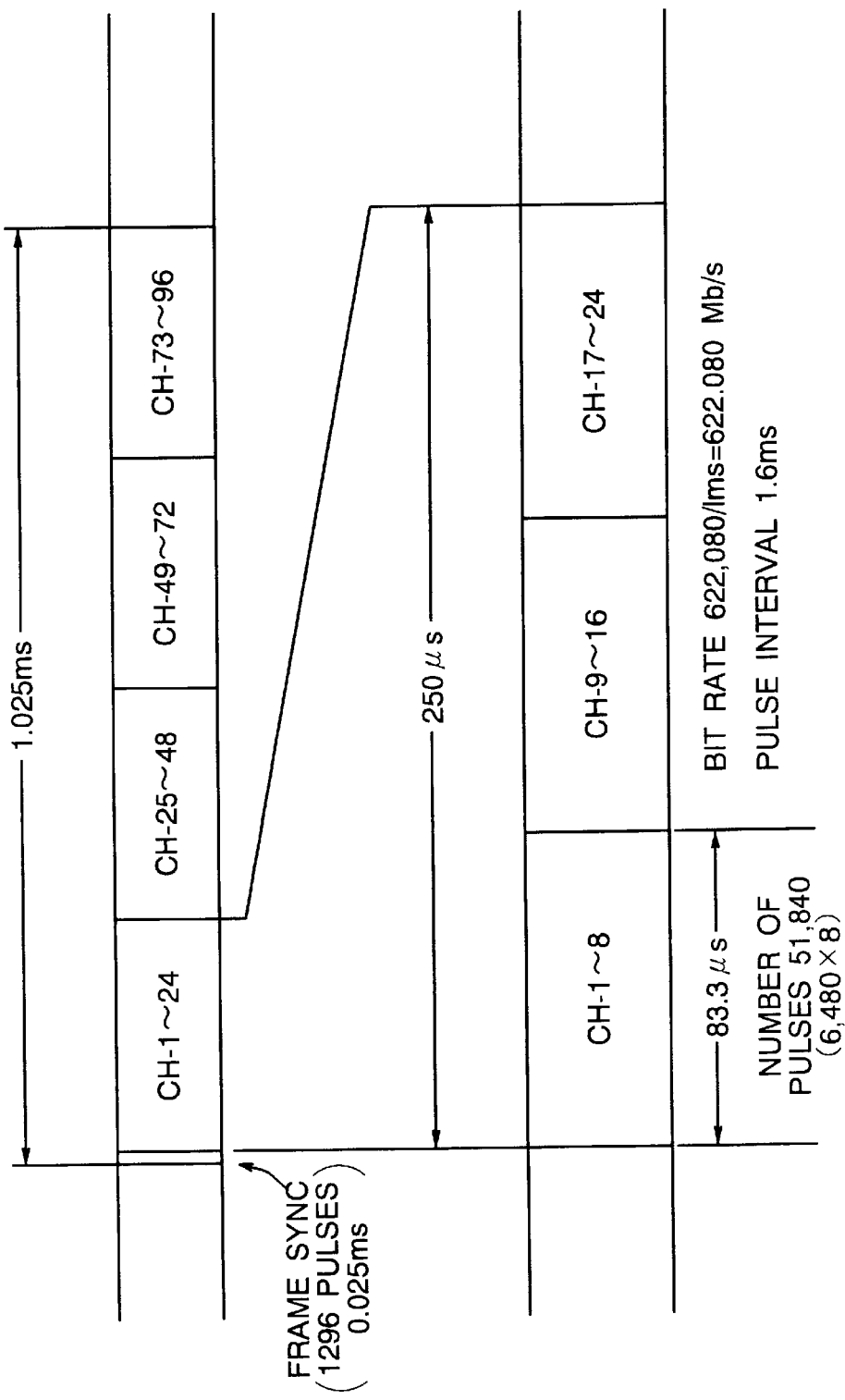
FIG. 6 is a block diagram showing another signal format of the present invention.
Figure 7:
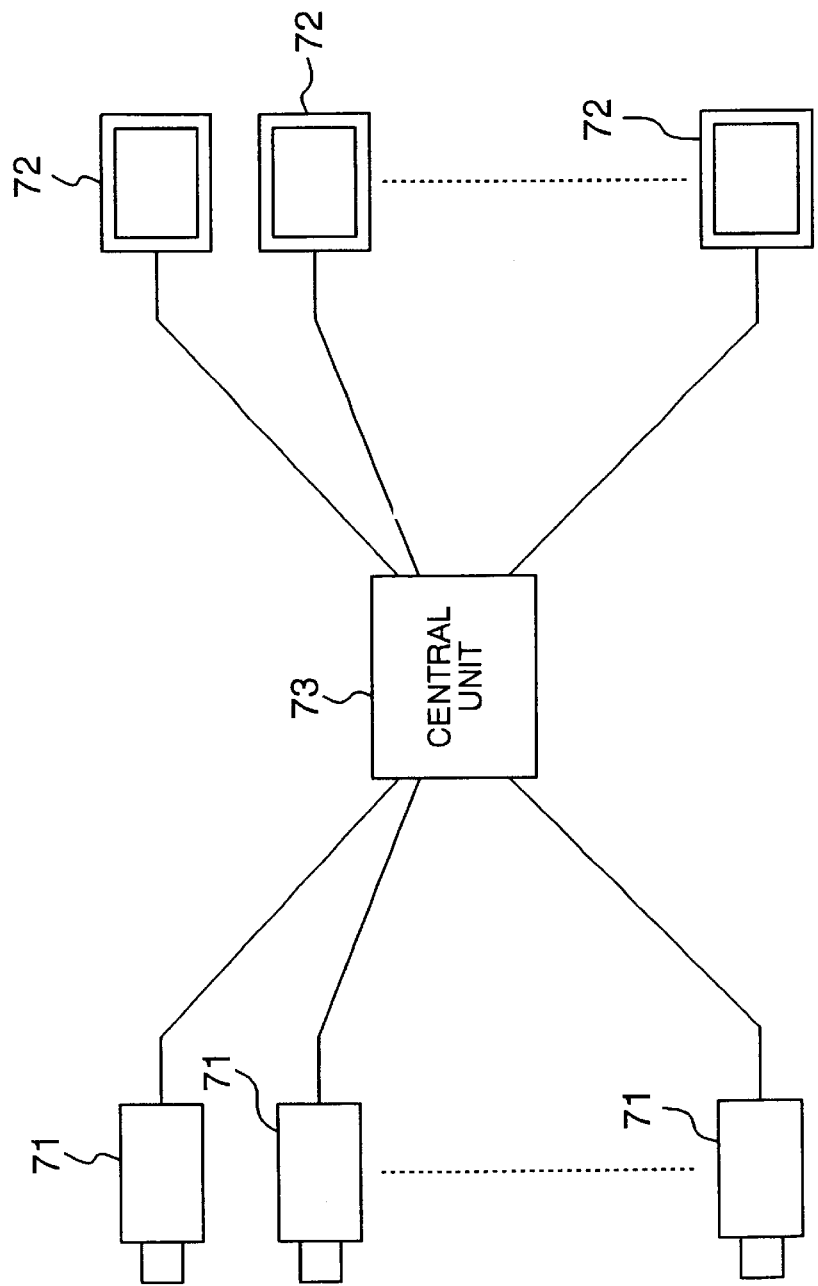
FIG. 7 is a block diagram showing a prior art system.
Figure 8:
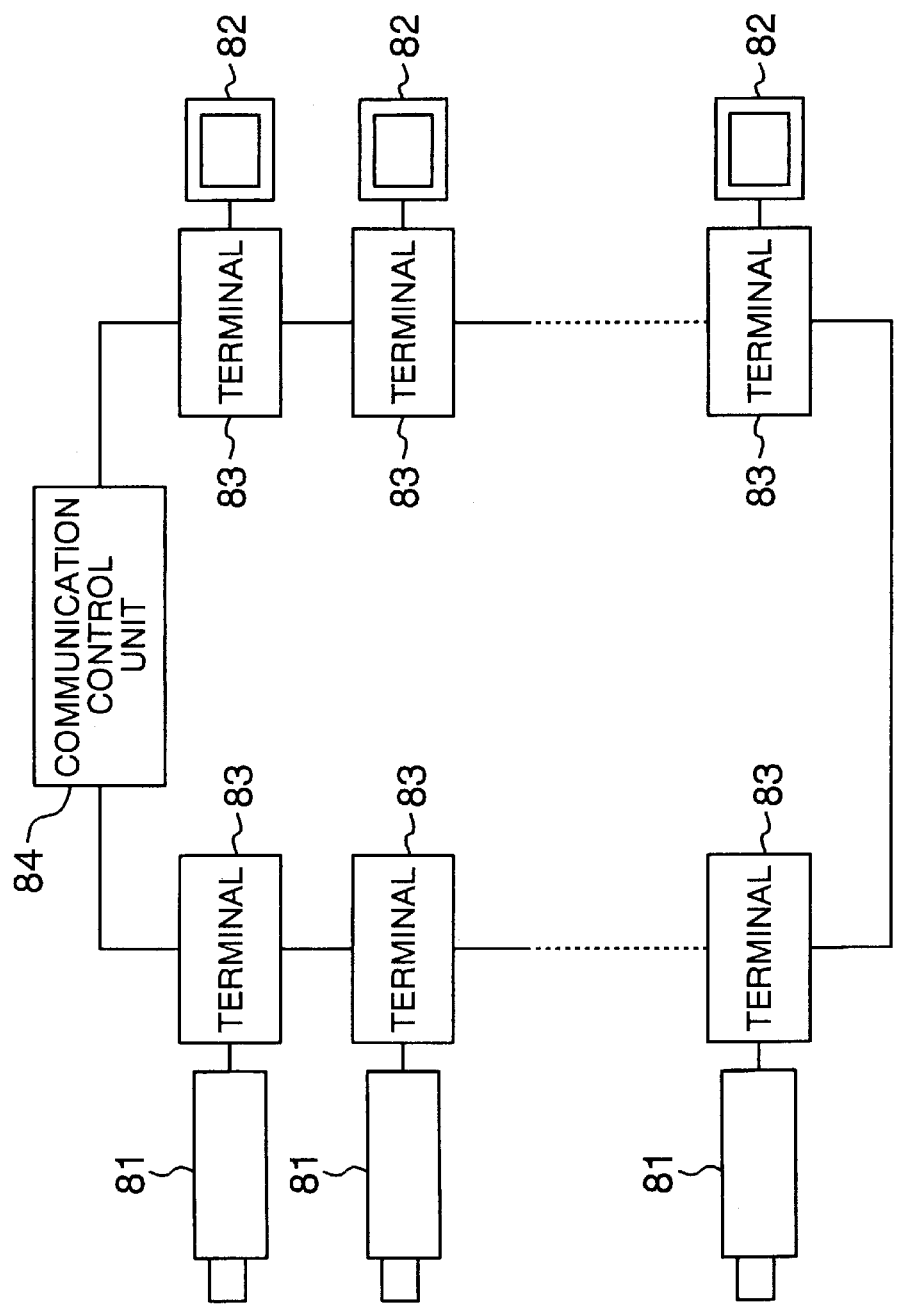
FIG. 8 is a block diagram showing another prior art system.

The configurations of digital signals which are transmitted on a time sharing multiplexing basis are shown in FIGS. 5 and 6. FIG. 5 shows a basic frame signal having for example, 8 channels (CH-1, . . . , CH-8). A slot of each of channels CH-1, . . . , CH-8 is allocated for every period of 1.025 ms including a frame synchronization period of 0.025 ms (1296 pulses) and a period of 1 ms for transmission of 8 channel data. Each channel for the period of 1 ms includes 125 $\mu$s, 6480 pulses. Each frame has a format shown in FIG. 5 and the bit rate is 51.84 Mb/s.

Each channel comprises channel sub-frame synchronization 168 pulses and 6312 pulses for video data as shown in FIG. 5. The channel sub-frame synchronization is inserted for more reliably detecting each channel slot and is also used for various controls and communications between transmission and receiving terminals as well as synchronization.

FIG. 6 shows a basic frame signal in case of 96 channels. A slot of each channel is allocated for every period of 1.025 ms including frame synchronization period of 0.025 ms (15552 pluses) and a period of 1 ms for transmitting 96 channel data. Each channel has a period of about 10.417 $\mu$s (6480 pulses) and is time-compressed to $\frac{1}{12}$ of the case of 8 channels. Besides synchronization pulses, pluses for various control and communications among transmission terminals, receiving terminals and timing devices are also contained in each of periods of frame synchronization and channel sub-frame synchronization.

The configuration of each transmission terminals 9 is for example as follows: An NTSC video signal which is an output of a TV camera 2 is digitally compressed to about 6 Mb/s by an encoder 3. The compressed video signal is transmitted by the pulse insert circuit 4 for a period of a channel, for example a channel CH-1 which is allocated. The transmission timing of each channel is calculated from the frame signal detected by the pulse insert circuit 4. Accordingly, in case of FIG. 6, the maximum number of channels is 96 and the bit rate is about 622 Mb/s. An electric signal is converted into an optical signal by an electro-optical converter incorporated in the pulse insert circuit 4 and is fed to the optical fiber cable 5 and transmitted therethrough. The frame synchronization signal is used as a reference for determining the signal transmission timing for each channel.

On the other hand, in each receiving terminal 10, the transmitted optical signal is converted into an electric signal by an opto-electric converter incorporated in the pulse branch circuit 6 and a bit synchronization signal and frame synchronization signal are detected therein. A video signal in a predetermined set channel is extracted and is decoded and expanded into an NTSC signal by a decoder 7 and is supplied to a video monitor 8 for display. The bit synchronization signal is used to detect and generate a position in which a bit signal should exist from transmission data of all transmitted signals.

The timing device (master repeater) 1 in FIG. 1 is adapted to correct the delay time occurred in the transmission line 5 and terminals 9 and 10 in the loop and to delay the signals so that they are continuous in units of a frame and to retransmit them. An example of the internal structure of the timing device 1 is shown in FIG. 2.

Figure 2:
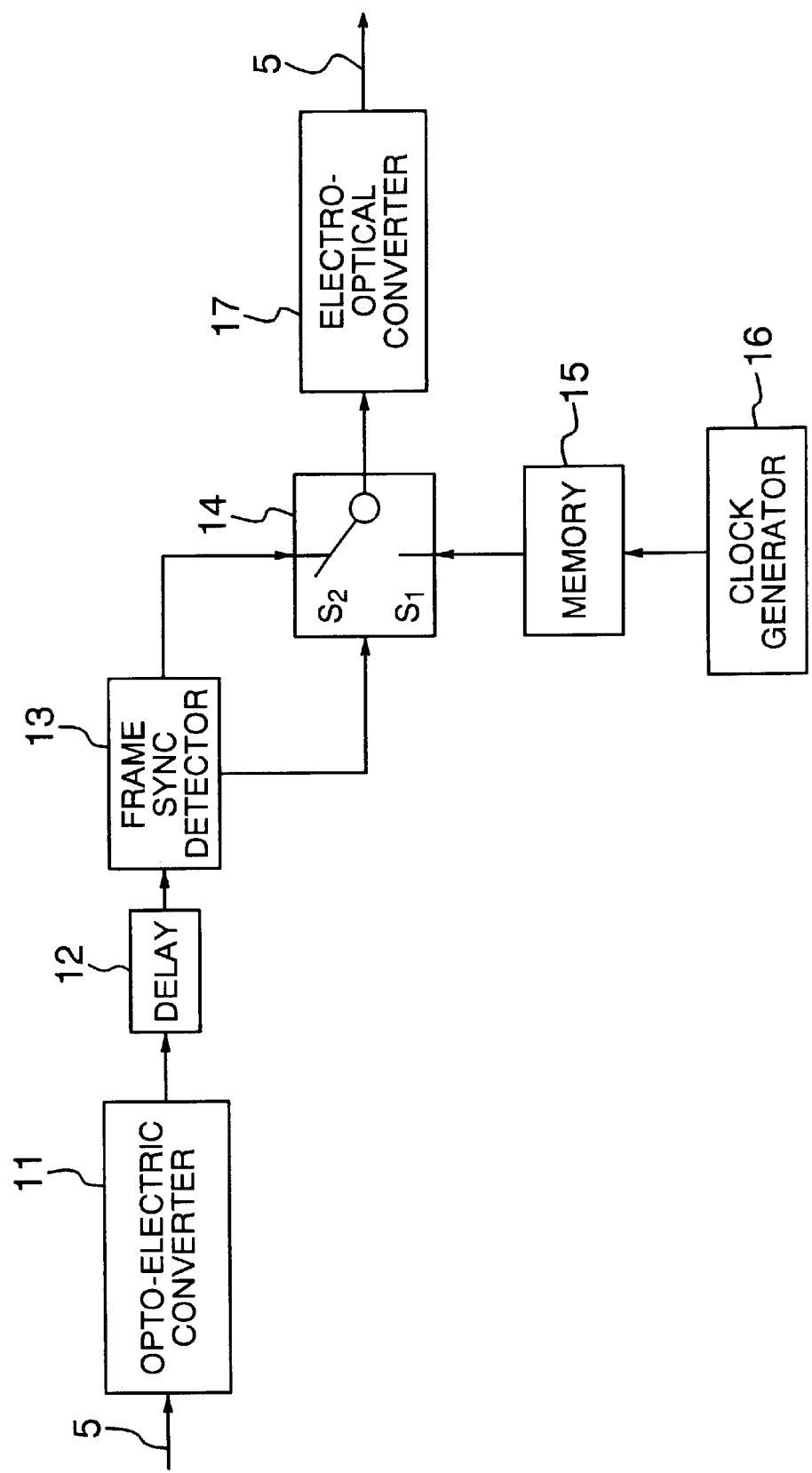
FIG. 2 is a block diagram showing the configuration of a timing device in the embodiment of FIG. 1.

In FIG. 2, a clock generator 16 generates a basic timing clock for transmission system and a memory circuit 15 stores a basic frame signal having a synchronization signal.

When the system is started up, the switch is connected to $S_1$ in the signal switch circuit 14. A basic frame signal, that is, a frame synchronization signal and various signals, etc. which are read from the memory circuit 15 in response to the above-mentioned timing clock, is output and is converted into an optical signal by the electro-optical converter 17 which is an output circuit, to be output to the transmission line 5. When the signal has returned back to the timing device 1 after cycling the transmission line 5 of the system one time, it is converted into an electric signal by the opto-electric converter 11 and is delayed by the delay circuit 12 so that the signal has a length of one frame (1.025 ms) including a delay caused in the loop circuit. The purpose of delaying the signal in such a manner is to prevent the next signal from being superposed on the firstly transmitted signal and to transmit the signals sequentially.

The frame synchronization signal is detected from the delayed signal by the frame synchronization detector 13 and is fed to the signal switch circuit 14 as a switch control signal and an output signal which is identical with the input signal to the detector 13 is applied to the signal switch circuit 14 as a signal to be switched.

When the frame synchronization signal is applied to the signal switch circuit 14 as the switch control signal, the switch is switched to $S_2$ and the signal from the frame synchronization detector 13 which has been delayed by one frame is passed through the switch circuit 14 as it is and the signal is converted into an optical signal by the electro-optical converter 17 and is output to the signal path. In this case, the above-mentioned delay is controlled so that the trailing edge of the first cycled signal is continuous to the leading edge of the second cycled signal.

Therefore, as far as the frame synchronization is detected after second cycle, output signals which have been delayed by a given period of time (one frame) are sequentially transmitted from the timing device 1 so that the frames are continuous.

Figure 3:
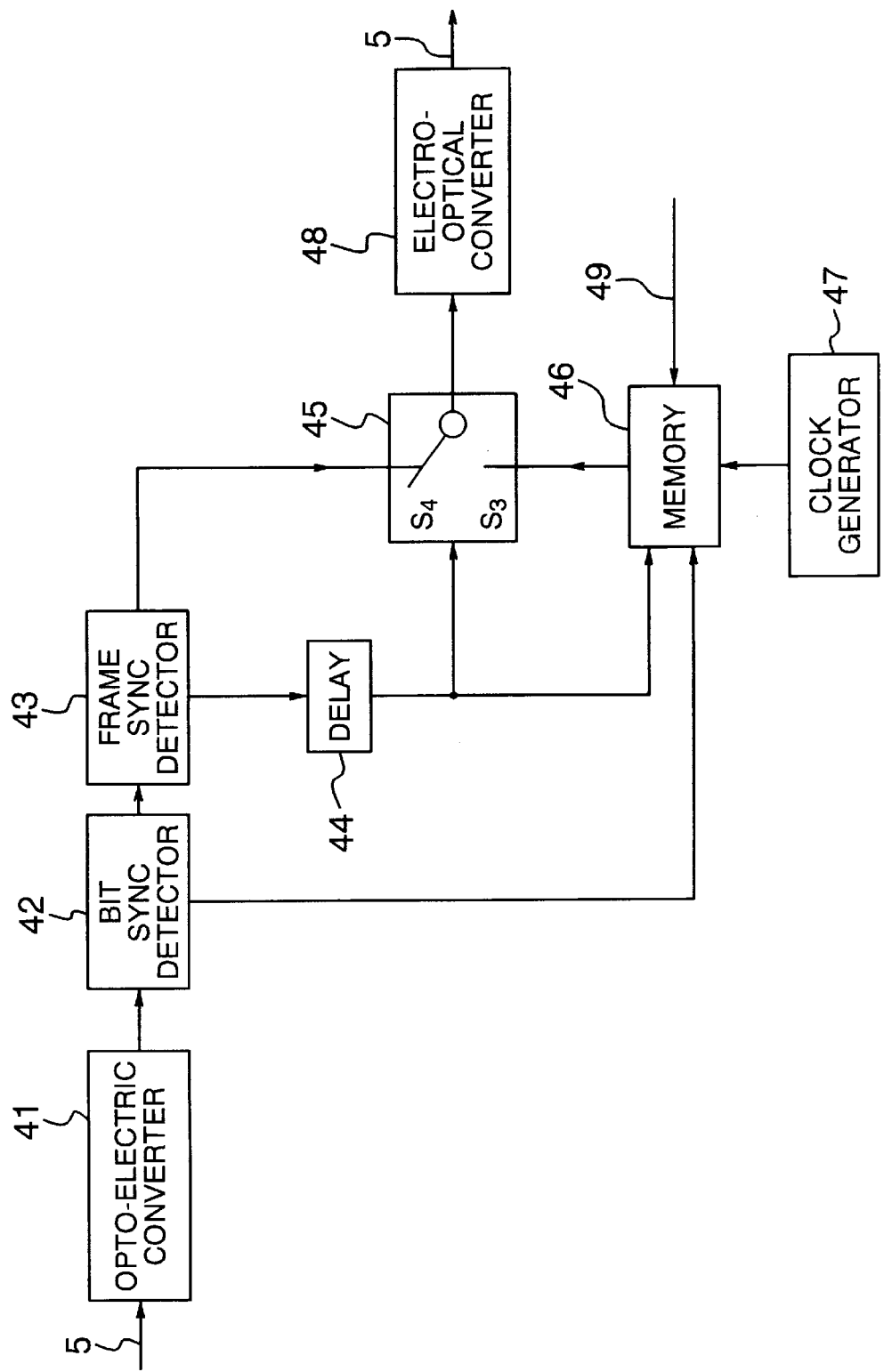
FIG. 3 is a block diagram showing the configuration of a pulse insert circuit of a transmission terminal in the embodiment of FIG. 1.

Now, an example of the configuration of the pulse insert circuit 4 in the transmission terminal 9 is shown in FIG. 3 and its operation will be explained.

First cycled basic frame signal which is output from the timing device 1 is input from the transmission line 5 to the opto-electric converter 41 where it is converted into an electric signal and sequentially supplied to the bit synchronization detector 42 and the frame synchronization detector 43 in which the bit synchronization signal and the frame synchronization signal are detected, respectively. The basic frame signal is generated in response to the basic timing clock. In the bit synchronization detector 42, the bit synchronization signal which is consecutive pulses synchronized with the clock is generated based upon the basic frame signal, that is, the frame synchronization signal and various signals. The basic frame signal is applied to the signal switch circuit 45 via the detectors 42 and 43. Detected bit synchronization signal is applied as a read clock to a memory circuit 46 which will be described hereafter. The frame synchronization signal is delayed in a delay circuit 44 by a period of time which determines the timing of a signal to be transmitted from the transmission terminal of interest. The delayed frame synchronization signal is applied to the signal switch circuit 45 and the memory circuit 46 as a switch control signal and a read signal, respectively.

On the other hand, a signal 49 which is obtained by encoding a video signal from the camera 2 in the encoder 3 is written into the memory circuit 46 in response to a clock signal from a clock generator 47. An output from the memory circuit 46 is output to a switch terminal $S_3$.

When a delayed frame synchronization signal is applied from the delay circuit 44 to the signal switch circuit 45 as a switch control signal, the signal switch circuit 45 operates to change the switch to $S_3$ position so that a signal which is read from the memory circuit 46 in the same timing is output to the transmission line 5 via the electro-optical converter 48. In other words, a video signal from a certain camera of the cameras 2 is converted into a digital signal and the digital signal is output to a predetermined channel, for example, CH-1. On the other hand, the channels other than CH-1 select a signal from the circuit 43 which is fed to the electro-optical convertor 48 via the detector 43 and the switch $S_4$ and is converted into an optical signal, which is output to the transmission line 5. In the other embodiment, the digital signal converted from the video signal may be compressed in the encoder 3.

Figure 4:
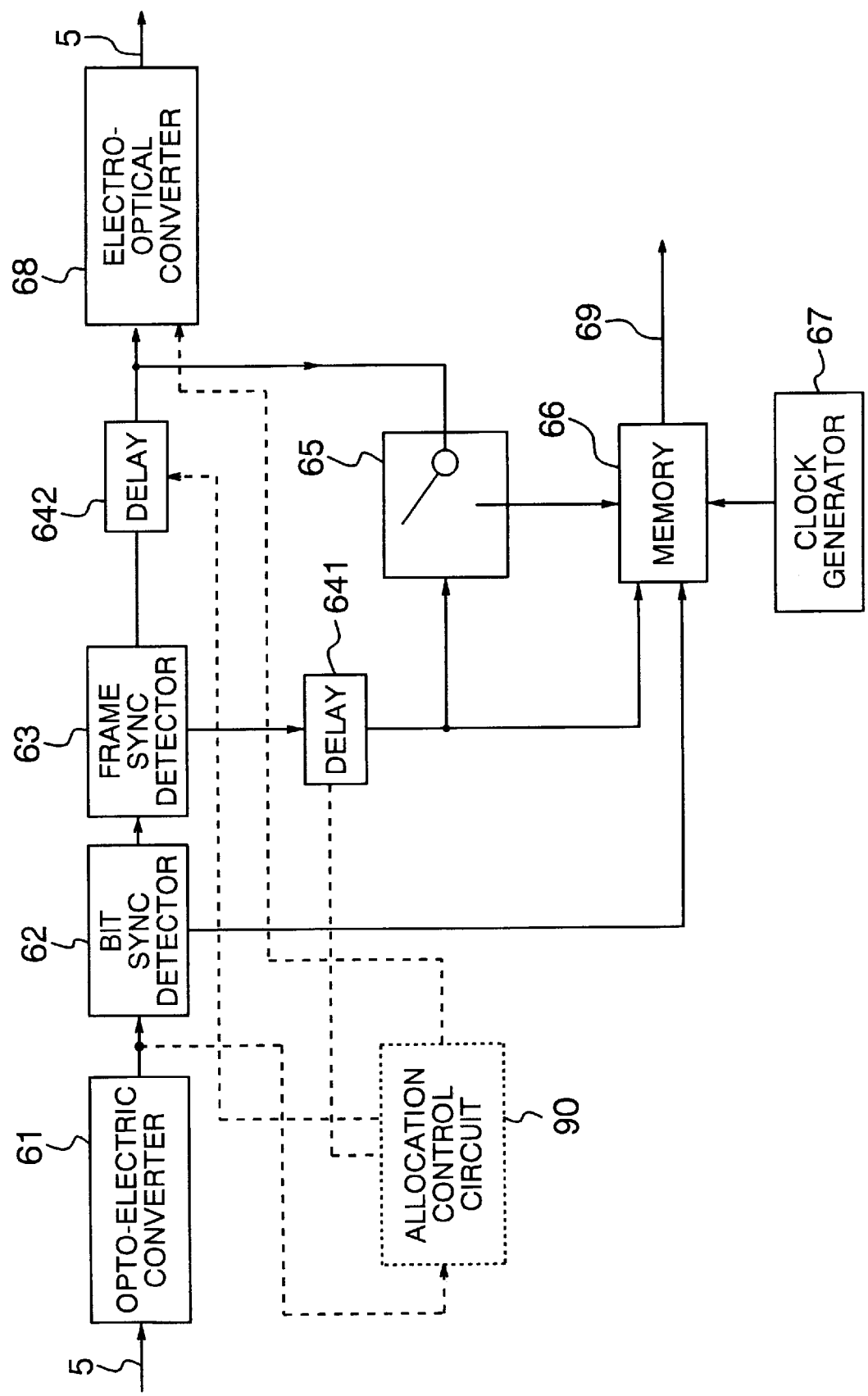
FIG. 4 is a block diagram showing the configuration of a pulse branch circuit of a receiving terminal in the embodiment of FIG. 1.

A configuration of the pulse branch circuit 6 having no allocation control unit 90 in the receiving terminal 10 is shown in FIG. 4 and now its operation will be described.

A signal input from the transmission line 5 is converted into an electric signal by an opto-electric converter 61 and is passed through a bit synchronization detector 62 and a frame synchronization detector 63 and is converted into the same optical signal as the input signal by an electro-optical converter 68 and is output to the transmission line 5.

A bit synchronization signal which is detected by the bit synchronization detector 62 is applied as a write clock to a memory 66 which will be described hereafter. The operation of the bit synchronization detecting circuit 62 is identical with that of the circuit 42 in the transmission terminal in FIG. 3. A frame synchronization signal which is detected by the frame synchronization detector 63 is delayed by delay circuits 641, 642 for determining the timing (position in time) of the channel to be received in respective receiving terminals 10 and then supplied to a signal switch circuit 65 and a memory 66.

The signal switch circuit 65 switches so that a transmission signal is supplied to the memory 66 in the same timing as the delayed frame synchronization signal. Simultaneously with this, the transmission signal is written into the memory 66 in the same timing in response to the bit synchronization signal.

Reading of stored signal is conducted in response to clock signals generated by a clock generator 67. A signal 69 which is read from the memory 66 is decoded by a decoder 7 and is displayed on a video monitor 8. When the signal 69 is compressed, it may be expanded in the decoder 7.

A signal on a desired channel can be received and displayed by making the delay time of the delay circuit 64 variable.

By configuring the system as mentioned above, a signal output from the timing device 1 has been compensated for the delay time caused by the transmission line and cables.

When a signal on each channel which has been output from the signal switch circuit 45 arrives at each originating terminal 9 which has transmitted it, a signal to be next transmitted which is stored in the memory 46 is read from the memory and is inserted in lieu of the returned signal.

Although the embodiments have been described with reference to cases in which the number of channels is 8 and 96, the system configuration can be provided with flexibility by modifying the channel configuration, for example, by providing 4 channels in which each of 2 channels comprises 2 blocks or by providing 12 channels in which each of 4 channels comprises 3 blocks. For example, a transmission line of n×m (n, m denote positive integers) channels may be formed by providing n channels each comprising m blocks.

In the above-mentioned embodiments, a system having a relatively simple structure can be provided in which no waiting time occurs in signal transmission among a plurality of transmission and receiving terminals.

Other embodiments of the present invention will be described with reference to FIGS. 9 to 18.

Figure 9:
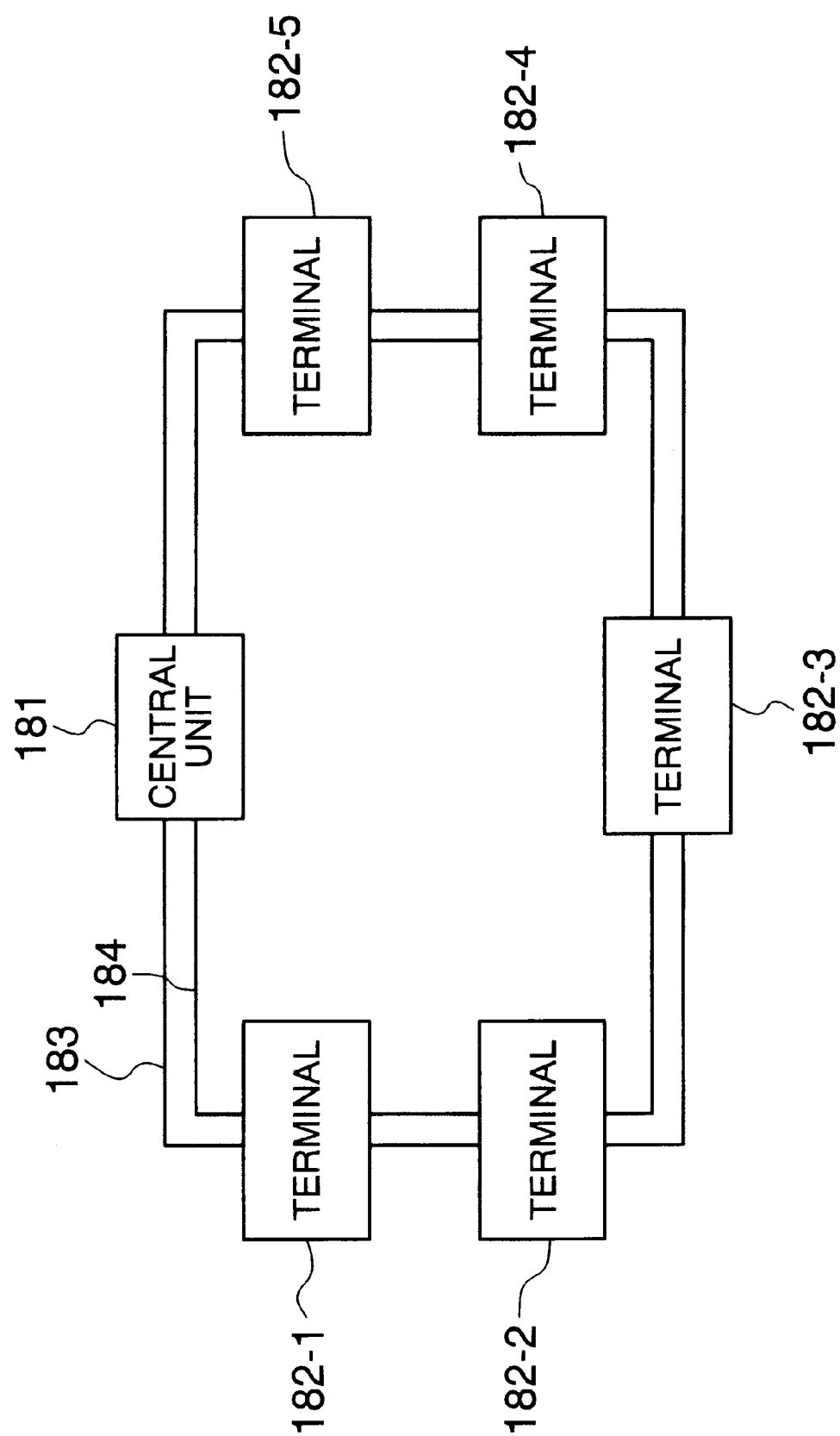
FIG. 9 is a schematic block diagram showing a digital transmission network of another embodiment of the present invention.

FIG. 9 is a schematic view showing a case in which the transmission network of the system of the embodiment of FIG. 1 is made dual.

In FIG. 9, reference numerals 182 (182-1 to 182-5) denote a plurality of terminals including devices such as TV cameras, microphones for monitoring a plurality of monitor cites which are dispersedly disposed in a wide area; 181 a central unit including monitors including video monitors, audio devices for monitoring images and sounds transmitted from a plurality of terminals 182; 183, 184 denote signal transmission cables such as optical fiber cables connected between the central unit 181 and terminals 182 and between plural terminals 182.

As shown in FIG. 9, in order to enhance the reliability of the transmission network, the transmission network is dual looped so that the availability is enhanced. Although the availability is 80% for example in a single loop, it can be enhanced to 96% by making the network dual looped.

In the digital transmission network, the central unit 181 converts a reference data signal having a frame synchronization signal, etc. in a given format which is divided into frame units and in which data insertion and extraction is possible into an optical signal and transmits the optical signal to a plurality of terminals 182 (182-1, 182-2, 182-3, 182-4 . . . ) through an optical fiber cable 183 (or optical fiber cable 184).

Each terminal 182 includes devices such as TV cameras, microphones and inserts data such as video signals picked up by TV cameras showing monitor cites and audio signals picked up by microphones into a predetermined position of the transmitted data signal having a predetermined format and/or extracts data from the transmitted data signal and transmits via the optical fiber cable 183 to next terminal 182 the data signal having a given format into which data such as video signal and audio signal are inserted.

The optical signal from the last terminal 182 is input to the central unit 181 via the optical fiber cable 183 and data such as necessary video signal or audio signal from each terminal is extracted from data signal having a given format.

The data of extracted video signal and audio signal is monitored by a video monitor and audio device.

If, for example, the optical fiber cable 183 is disconnected between any terminals 182, no optical signal would be transmitted to the next terminal 182. Transmission of data can not be carried out so that monitoring in the central unit 181 is impossible.

In such an event, an optical fiber cable 184 which is provided as a backup (or standby) cable is used to continue data transmission therethrough. This enables monitoring in the central unit 181.

In such a digital transmission network in which there are provided a dual loop comprising a working (or active) optical fiber cable 183 and a backup optical fiber cable 184, system down can be prevented.

In accordance with the present embodiment, there is provided a digital transmission network characterized in that maintenance of the transmission network and location of fault position can be easily conducted in event of a fault of the transmission network which is connected in the form of loop by an optical fiber cable and in that control using a complicated control circuit and sophisticated software is not required and in that the network is economical and its reliability, availability and serviceability is enhanced.

In the embodiment of the digital transmission network, at least one central unit is connected to a plurality of terminals via a dual looped optical fiber cable comprising a working line and backup line so that digital data signals such as video and audio signals are transmitted as optical signals and loop-backed control signals are transmitted from the central unit to all the terminals to bring all the terminals into an state enabling the signals to be input from the optical fiber cable of the backup line.

In the embodiment of the digital transmission network, loop-back control signals are transmitted from the central unit to all the terminals to bring all terminals into a state enabling signals to be input from the optical fiber cable of the backup line and then control signals are transmitted for bringing the terminals into a state enabling the signals to be input from the working line in order of from terminal proximity to the central unit to remoter terminal so that normal operation of the terminals is confirmed in order of from terminal proximity to the central unit to remoter terminal.

The embodiment of the digital transmission network will be described in detail.

Figure 10:
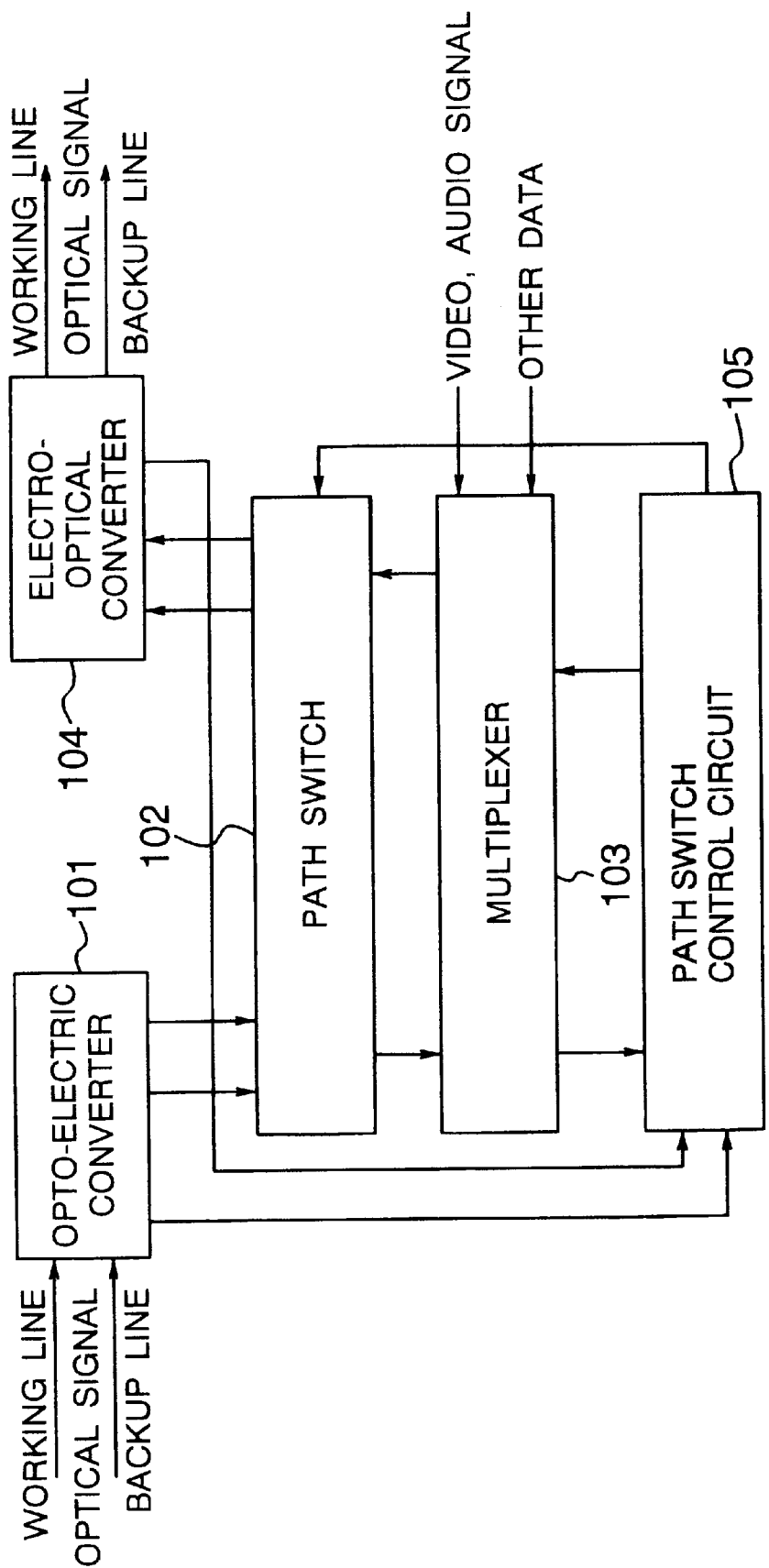
FIG. 10 is a block diagram showing terminals which are used for the digital transmission network of the embodiment of FIG. 7.

FIG. 10 is a block diagram showing a terminal, a plurality of which are used for the digital transmission network of the present invention.

In FIG. 10, a reference numeral 101 denotes an opto-electric converter (including two converters for an active line and a standby line) for converting an optical signal transmitted from the optical fiber cable into an electrical signal (data signal); 104 denotes an electro-optical converter (including two converters for an active line and a standby line) for converting an electric signal (data signal) into an optical signal transmitted to other devices via an optical fiber cable; 102 denotes a path switch for switching the path for data signal which is received and converted by the opto-electric converter 101 and for switching the path of data signal which is received and transmitted by the electro-optical converter 104; 103 denotes a multiplexer for carrying out insertion of data from monitors (not shown) such as TV cameras and microphones into data signal which is received and converted by the opto-electric converter 101 and extraction of data from data signal; and 105 denotes a path control circuit for controlling the path switch 102 in response to an instruction from the central unit, an optical input level detecting signal from the opto-electric converter 101, an optical output level detecting signal from the electro-optical converter 104 and an error detection signal of the input data signal from the multiplexer 103.

In the terminal, the optical signal transmitted from the optical fiber cable is received by the opto-electric converter 101 so that it is converted into data signal and is then output to the path switch 102.

The path switch 102 outputs the data signal inputted from the opto-electric converter 101 to the multiplexer 103 and switches the path for the data signal in response to the control signal from the path control circuit.

The multiplexer 103 inserts data such as video and audio data from TV cameras and microphones (not shown) and other data, for example, data from a computer into predetermined positions of a data signal (for example constituted by a plurality of frames, each frame including a frame synchronization data, network control data (equivalent to the channel subframe synchronization signal of FIG. 5) and video, audio and terminal data, etc. which are divided into a plurality of channels) which is input from the path switch 102 and extracts necessary data and outputs the inserted or extracted data signal to the path switch 102.

The path switch 102 outputs a data signal input from the multiplexer 103 to the electro-optical converter 104.

The electro-optical converter 104 converts a data signal input from the path switch 102 into an optical signal and transmits it to other terminals via the optical fiber cable.

A control signal for a loop-back instruction or input and output level detection signals of the optical signal from the opto-electric converter 101, the electro-optical converter 104 and the multiplexer 103 are input to the path control circuit 105 for controlling the path switch 102 in response to the control signal or detection signals.

The signals which are input to the path control circuit 105 from the opto-electric converter 101 are a control signal for the loop-back instruction (included in the network control data) from the central unit (106 in FIGS. 13 to 16 which will be described hereafter) in the transmission network and an input level detection signal of the optical signal in the opto-electric converter 101. A signal input to the path control circuit 105 from the electro-optical converter 104 is an output level detection signal of the optical signal in the electro-optical converter 104. A signal input to the path control circuit 105 from the multiplexer 103 is an error detection signal of a data signal input to the multiplexer 103.

The path control circuit 105 controls the path switch 102 in response to the control signal of loop-back instruction and controls the path switch 102 in response to the input level detection signal of the optical signal, the output level detection signal of the optical signal and the error detection signal of the data signal.

Figure 11:
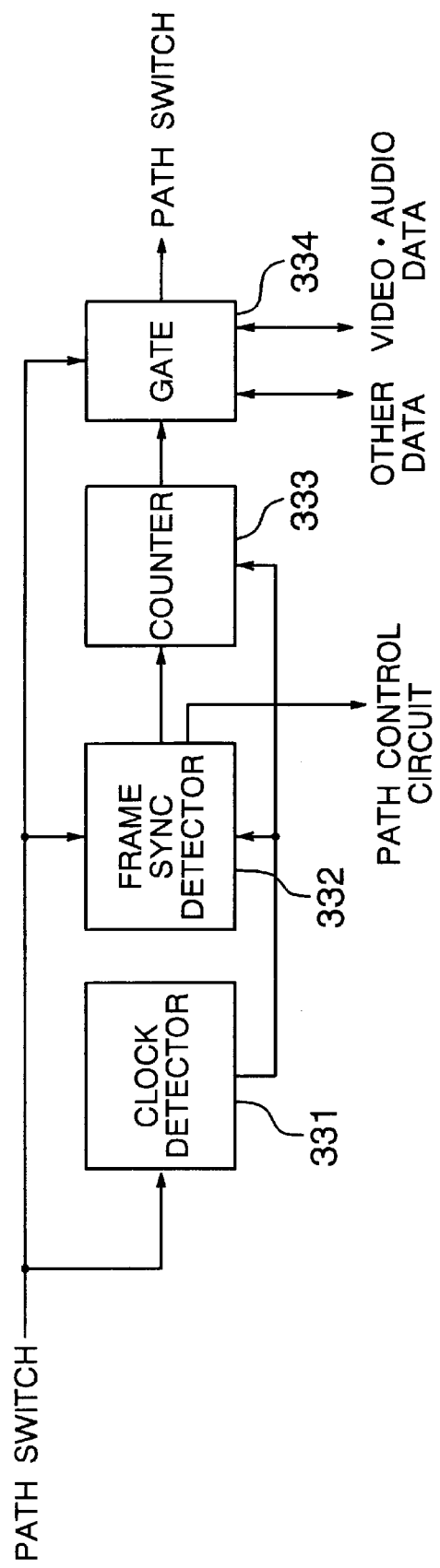
FIG. 11 is a block diagram showing the configuration of a multiplexer of the terminal of FIG. 10.

FIG. 11 is a block diagram showing the configuration of the multiplexer 103. In FIG. 11, a clock signal is detected by a clock detector 331 from a signal input from the path switch 102. A signal input from the path switch 102 is sampled in response to this clock signal and frame synchronization is detected by a frame synchronization detector 332. If frame synchronization detection can not be conducted, an error signal is fed to a path control circuit 105. The clock signals are counted by a counter 333 from the frame synchronization signal and write and read of data in a given frame position is carried out by a gate 334. The signal which video and audio data and the other data have been read from or written into in predetermined positions thereof is output to the path switch 102.

Figure 12:
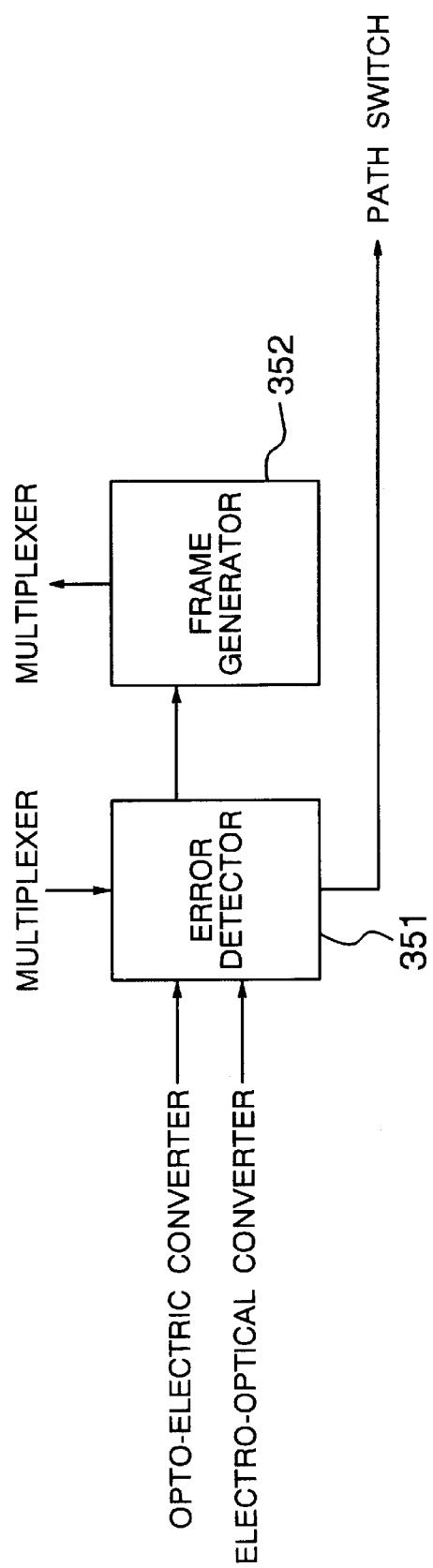
FIG. 12 is a block diagram showing a path control circuit of the terminal in FIG. 10.

FIG. 12 is a block diagram showing a configuration of a path control circuit 105. With reference to FIG. 12, in the path control circuit 105, an error detector 351 detects an input signal level abnormal signal from the opto-electric converter, an output optical level abnormal signal from the electro-optical converter and a frame synchronization detection signal from the multiplexer and outputs a path switch signal to the path switch 102. Depending upon the error condition, a frame generator 352 is started up to generate a frame for informing of the error condition and outputs it to the path switch 102 via the multiplexer 103.

A power supply (not shown) for the terminal includes a backup power source (not shown). Electric power is usually supplied to all circuits from a main power supply. In event of a failure of the main power supply, power is supplied to the opto-electric converter 101, path switch 102, electro-optical converter 104 from the backup power supply so that maintenance of minimum digital transmission network is possible.

Figure 13:
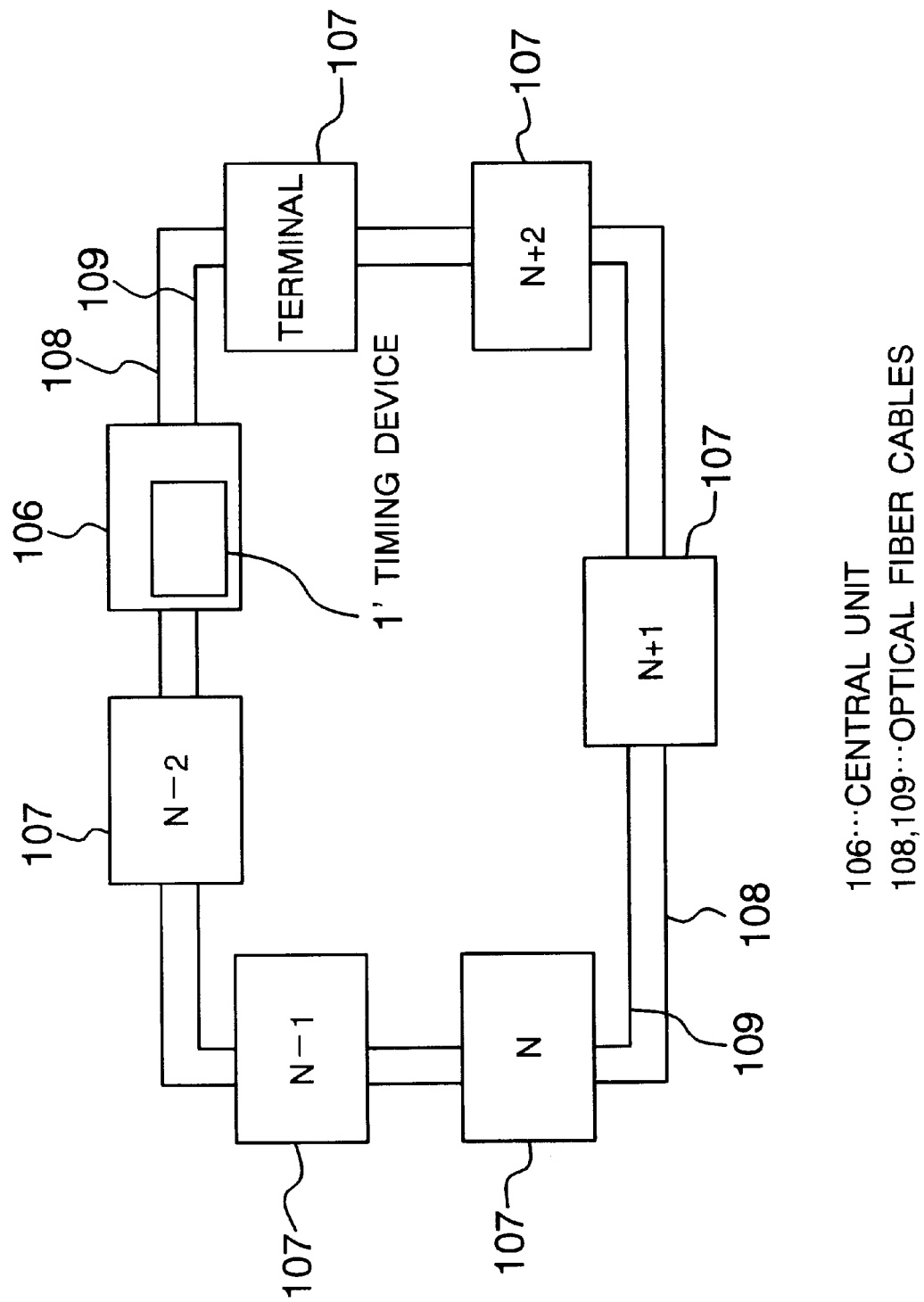
FIG. 13 is a block diagram showing a digital transmission network of another embodiment of the present invention.

FIG. 13 is a block diagram showing the digital transmission network of the present invention in which a plurality of terminals shown in FIG. 10 are disposed.

In FIG. 13, a reference numeral 107 denotes a plurality of terminals which are provided with monitors such as TV cameras, microphones for monitoring a plurality of monitor sites which are dispersed in a wide area; 106 denotes a central unit including monitor devices such as video monitors and audio devices for monitoring images and sounds transmitted from said plurality of terminals 107 and for controlling the terminals 107; 108 and 109 denote optical fiber cables for transmitting optical signals, which are connected between the central unit 106 and the terminals 107 and among a plurality of the terminals 107.

The transmission loop which is connected through the optical fiber cable 108 constitutes a working loop and the transmission loop which is connected through the optical fiber cable 109 constitutes a backup loop.

In the digital transmission network of FIG. 13, the central unit 106 generates a reference data signal in units of a frame having a frame synchronization signal and time slots to which each channel is allocated, etc. in a given format, and allowing data insertion and extraction and converts it into an optical signal and transmits it to a terminal 107N−2 via the optical fiber cable 108.

The terminal 107N−2 includes monitor devices such as TV cameras, microphones and inserts data such a video signal picked up showing monitor cites and audio signals picked up by microphones into transmitted data signal having a given format in a predetermined position fed from the central unit 106 and/or extracts data from the transmitted data signal and transmits via the optical fiber cable 108 to next terminal 107N−1 the data signal having a given format into which data such as video signal and audio signal are inserted.

The plurality of terminals 107 (N−1, N, N+1, N+2, . . . ) each insert video and audio signals into a data signal and extract data from the data signal as in the terminal 107N−2 and transmits it to next terminal.

The optical signal from the last terminal 107 in the transmission network is input to the central unit 106 via the optical fiber cable 108 and data such as necessary video signal or audio signal from each terminal is extracted from data signal having a given format so as to allow monitoring by the video monitor, audio device or the like.

It will now be described as to how the terminals are operated in the event of failure which occurs in he digital transmission network of the present invention n which a plurality of terminals are disposed as shown in FIG. 13.

If a fault occurs for example, the optical fiber cable between the terminals 107N−1 and 107N is disconnected, or an opto-electric converter disposed at an input of the terminal 107N or an electro-optical converter disposed at an output of the terminal 107N−2 is faulty, all terminals downstream of the faulty terminal are automatically brought into a state which enables signals to be input from the backup loop using the optical fiber cable 109. Then, the terminals are sequentially returned into a normal operation in order of from terminal proximity to the central unit 106 to remoter terminal in response to an instruction from the central unit 106.

If, however, the optical fiber cable between terminals 107N−1 and 107N is disconnected, the terminal 107N−1 becomes abnormal when it is returned to the normal state. It can be thus confirmed that the terminals until the terminal 107N are normal.

Then, the central unit 106 switches the output of the faulty terminal 107N−1 to the backup loop for confirming its operation under control of a loop back instruction.

Figure 14:
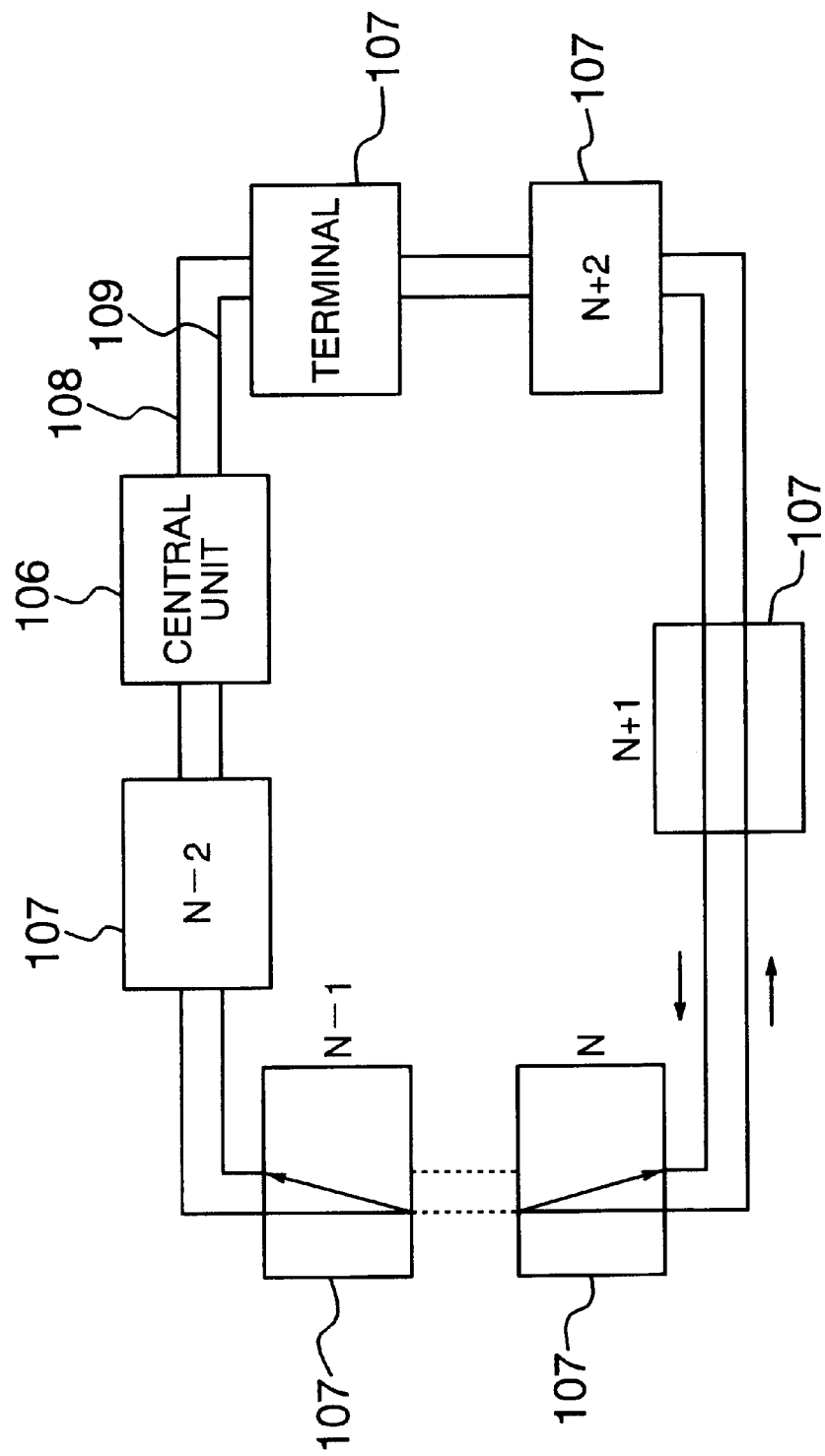
FIG. 14 is a block diagram for explaining an operation loop 1 in the event of a fault of the digital transmission network of the embodiment in FIG. 13.

If the terminal 107N−1 is normal operated, the 25 disconnection of the optical fiber cable between terminals 107N−1 and 107N can be confirmed. Accordingly, a loop is formed as shown in FIG. 14.

If the terminal 107N−1 is not normally operated when its output is switched to the backup loop, it is determined that the electro-optical converter of the terminal 107N−1 is faulty or power supply to the optical part is interrupted. Accordingly, the output of the terminal 107N−2 is switched to the backup loop.

Figure 15:
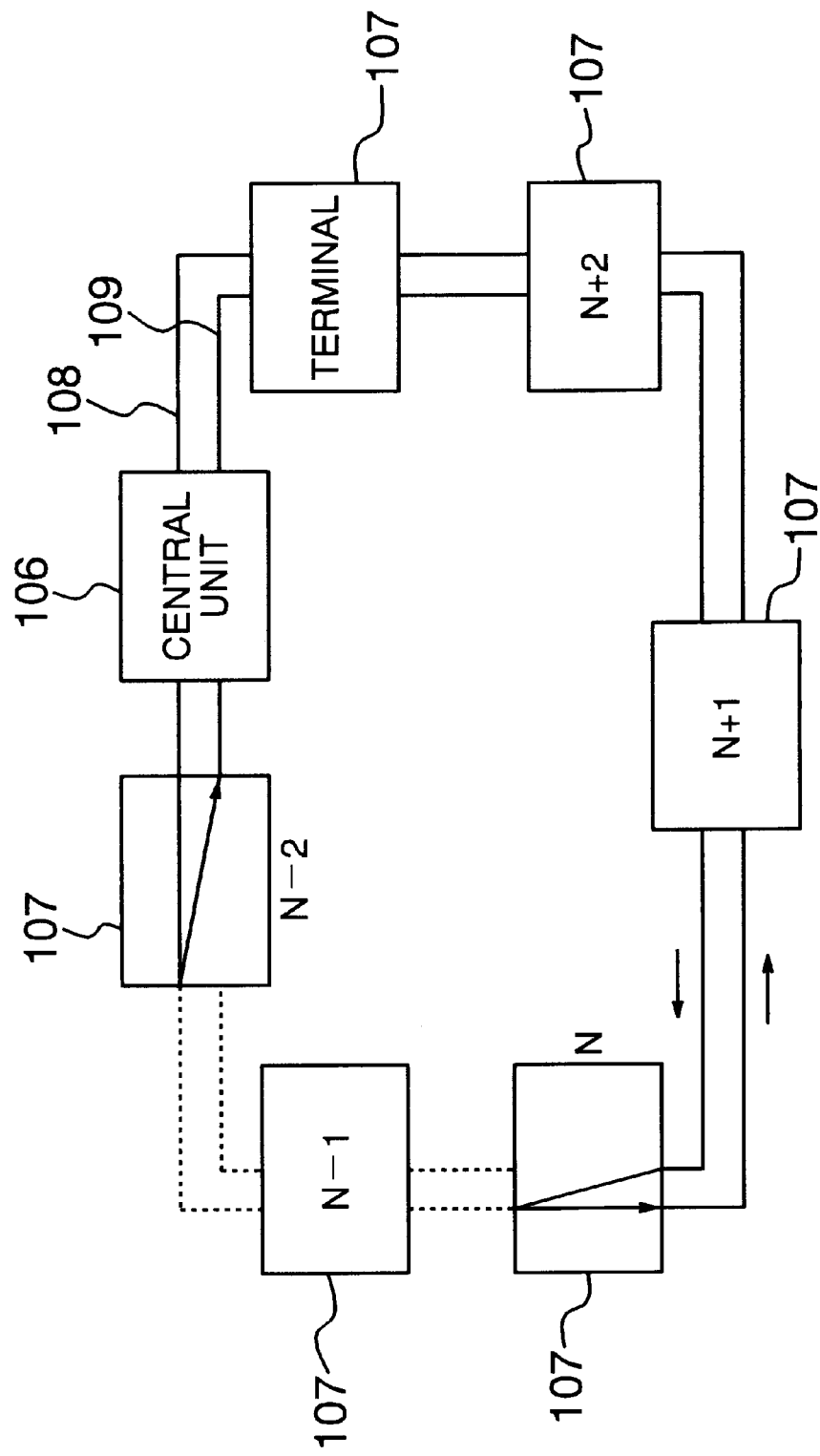
FIG. 15 is a block diagram for explaining an operation loop 2 in the event of a fault of the digital transmission network of the embodiment in FIG. 13.

After the central unit 106 has determined that the terminal 107N−1 is faulty, it isolates the terminal 107N−1 to assume the system loop back state to form a loop as shown in FIG. 15.

If the opto-electrical converter disposed at an input of the terminal 107N is faulty, the terminal 107N is brought into an abnormal state when the output of the terminal 107N is switched to the backup loop. Fault of the terminal 107N can thus be identified and a loop as shown in FIG. 14 is formed.

If the electrical system of the terminal 107N is faulty, fault location determining operation which is started from the central unit 106 is conducted as mentioned above. Since the terminal 107N+1 is brought into an abnormal state when the loop is returned to the normal loop by an instruction from the central unit 6, it can be identified that the terminal 107N or 107N+1 is faulty.

Figure 16:
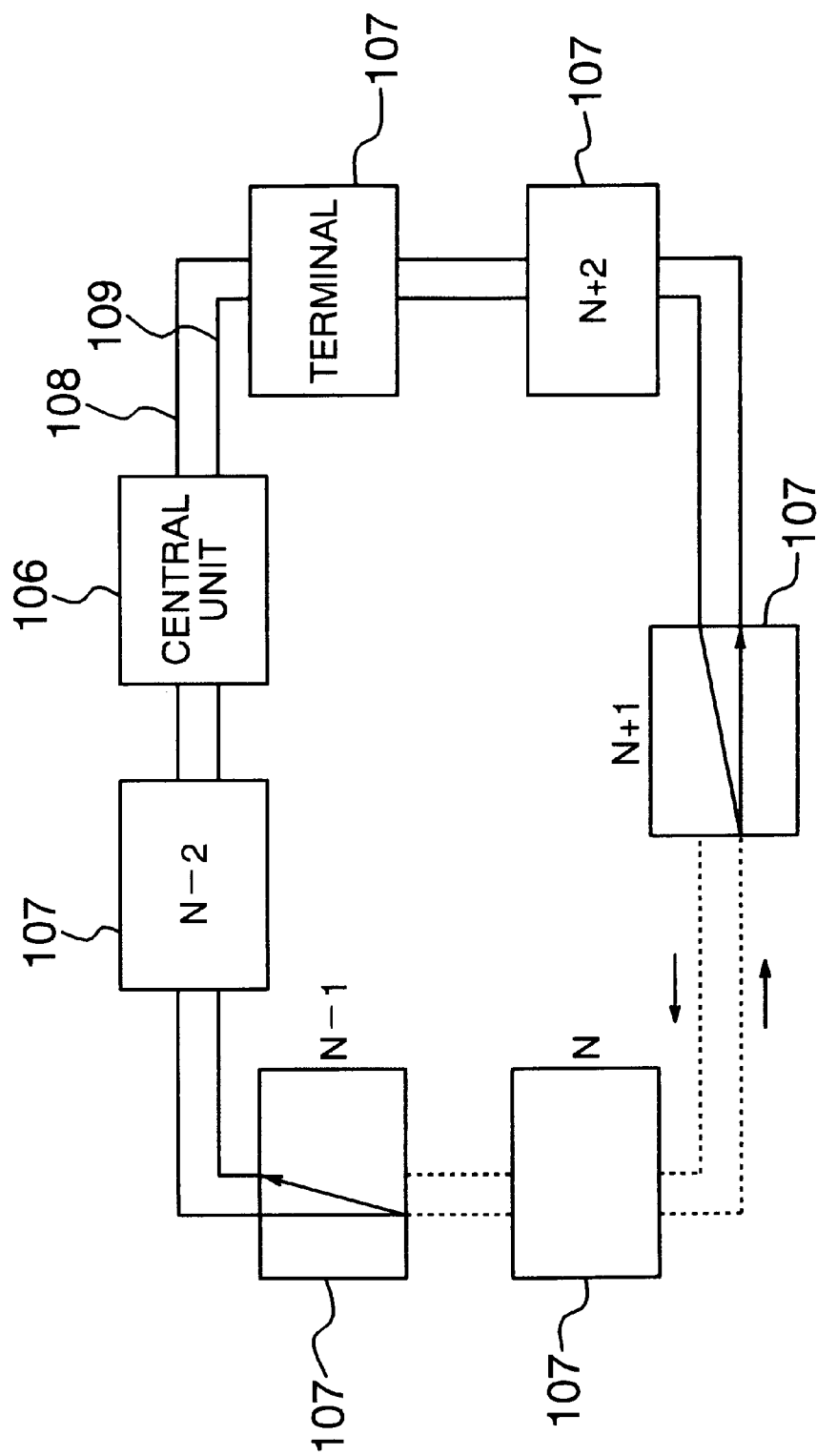
FIG. 16 is a block diagram for explaining an operation loop 3 in the event of a fault of the digital transmission network of the embodiment in FIG. 13.

If the output of the terminal 107N is switched to the backup loop under control of the central unit 106, abnormal operation occurs. Accordingly, it can be determined that the terminal 107N is faulty. In such a manner, location of faulty position is identified and a loop is formed as shown in FIG. 16.

Figure 17:
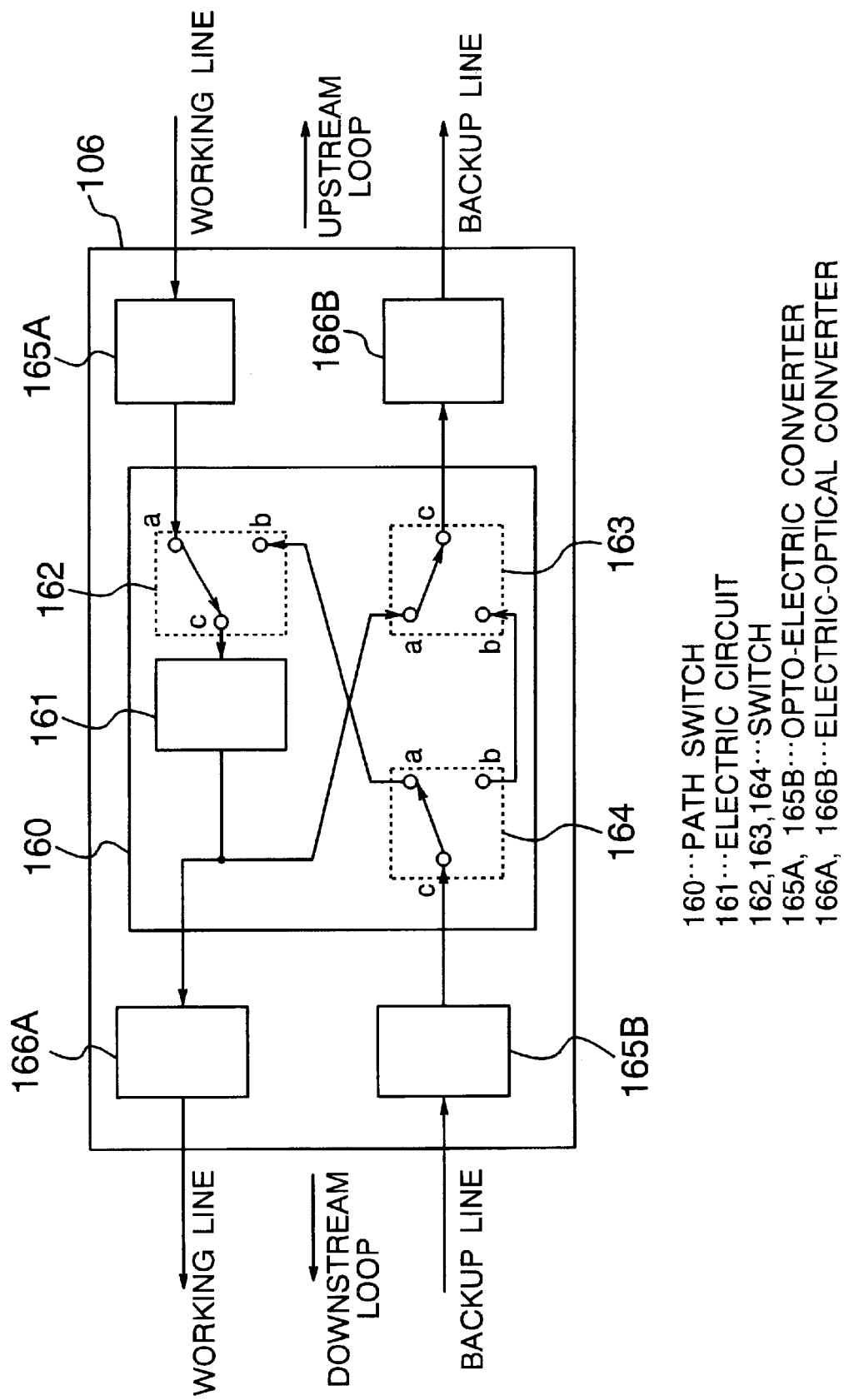
FIG. 17 is a block diagram for explaining the operation of a path switch included in a central unit of the digital transmission network of the embodiment of FIG. 13.

The detailed circuit of a path switch 60 which is included in the central unit 106 for locating the faulty position by the above-mentioned fault responding operation to implement the normal operation is shown in detail in FIG. 17.

FIG. 17 shows only an opto-electrical converter 165, an electro-optical converter 166 and a path switch 160 which are provided in the central unit 106.

In the normally operating loop, a data signal which is converted and output by the working opto-electric converter 165A is passed through a-c line of a switch 162 of the path switch 160 and input to the electric circuit 161. The electric circuit 161 comprises the multiplexer 103 and the path control circuit 105 which are shown in FIG. 10.

The output of the electrical circuit 161 is converted into an optical signal by the electro-optical converter 166A of the working line and is output to the loop of the working line.

When the fault in a downstream loop is located in the event of a fault, the data signal which is converted and output by the opto-electric converter 165B of the backup line is passed through a c-a line of the switch 164 and a b-c line of the switch 162 and input to the electric circuit 161.

The output of the electric circuit 161 is converted by the electro-optical converter 166A of the working line and is output to the loop of the working line.

When a fault of the upstream loop is located, the data signal which is converted and output by the opto-electric converter 165A of the working line is passed through an a-c line of the switch 162 and output to electric circuit 161.

The output of the electric circuit 161 is passed through the a-c line of the switch 163 and is converted into an optical signal by the electro-optical converter 166B of the backup line and is output to the loop of the backup line.

On system loop-back, in order to use both loops of the working and backup lines, the data signal which is input from the working line loop and converted by the opto-electric converter 165A of the working line is passed through the a-c line of the switch 162 and input to the electric circuit 161.

The output of the electric circuit 161 is converted into an optical signal by the electro-optical converter 166A of the working line and is output to the working line loop.

The data signal from the backup loop which is converted by the opto-electric converter 165B of the backup line and is input is passed through c-b line of the switch 164 and b-c line of the switch 163 and is output to the backup loop from electro-optical converter 166B of the backup line.

Figure 18:
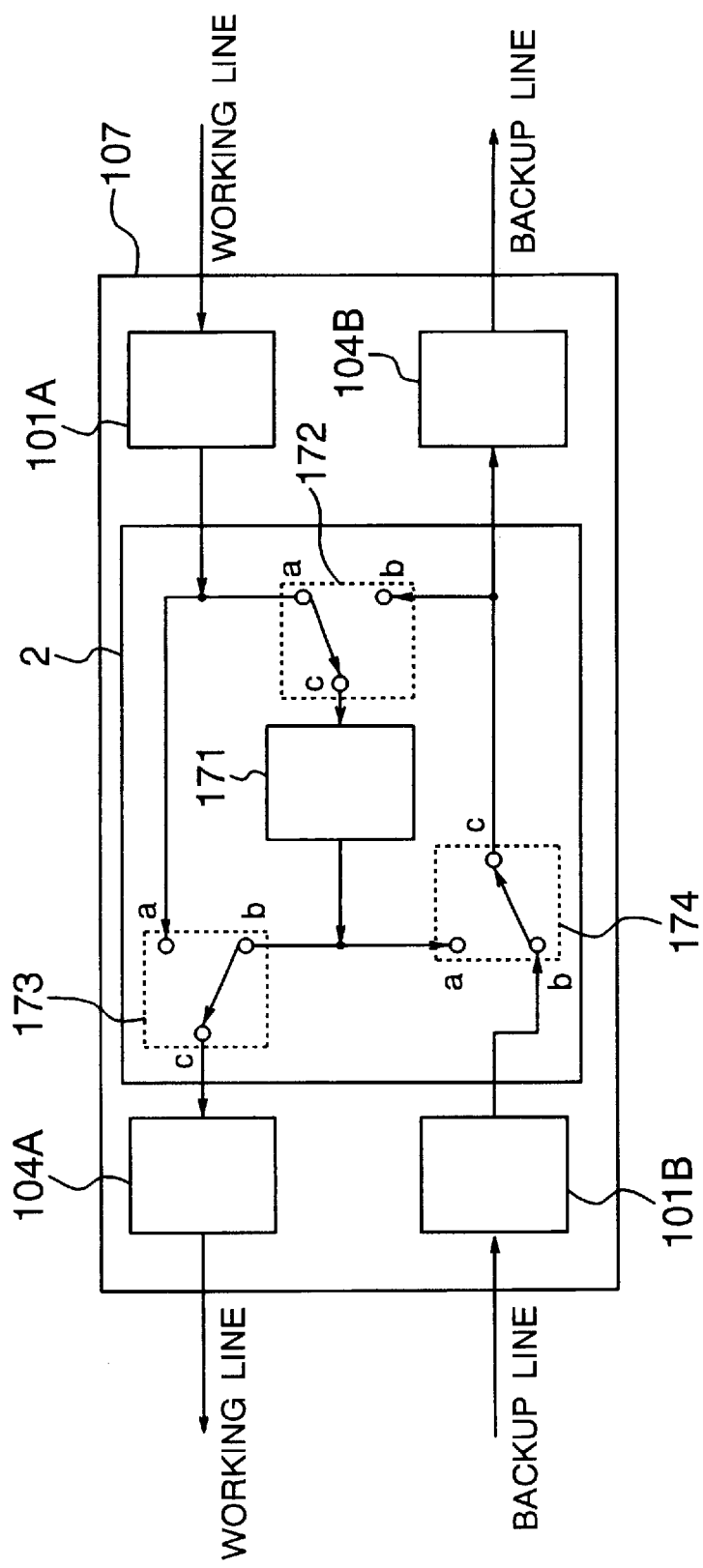
FIG. 18 is a block diagram for explaining the operation of a path switch included in a terminal of the digital transmission network of the embodiment of FIG. 13.

Detailed circuit of the path switch 2 which is included in the terminal 107 for fault responding operation is shown in FIG. 18.

FIG. 18 shows only opto-electric converters 101A, 101B, electro-optical converters 101A, 104B and path switches 102 which are included in the terminal 107.

In the loop which is normally operating, the data signal which is converted by the opto-electric converter 101A of the working line and is input is passed through a-c line of the switch 172 and input to the electric circuit 171.

The output of the electric circuit 171 is passed through b-c line of the switch 173 and is converted into an optical signal by the working line electro-optical converter 104A and is output to the working loop.

When the input loop is operated, the data signal which is converted by the backup line opto-electric converter 101B and is input is passed through b-c line of the switch 174 and b-c line of the switch 172 and input to the electric circuit 171.

The output of the electric circuit 171 is passed through b-c line of the switch 173 and is converted into an optical signal by the working line electro-optical converter 104A and is output to the working loop.

When the output loop is operated, the data signal which is converted by the working line opto-electric converter 101A and input data signal is passed through a-c line of the switch 172 and is input to the electric circuit 171.

The output of the electric circuit 171 is passed through a-c line of the switch 174 and is converted into an optical signal by the backup line electro-optical converter 104B and is output to the backup loop.

Fault location identification and loop maintenance of the digital transmission network is made possible by using both central unit and terminals having these features.

Although the monitor system has been described in the foregoing embodiments, the present invention can be of course applied to data transmission system as well as video signal transmission system.

In the above-mentioned embodiments, the digital transmission network can be provided in which maintenance and fault location identification can be easily conducted, in which no control using complicated control circuit and sophisticated software is required and its system reliability, availability and serviceability is enhanced and which is economical.

In the foregoing embodiments, the transmission line (cable) of the transmission network is dual-looped. However, if the cable is dual-looped, the cost of cable and its installation is generally expensive. Moreover, if the optical cable is used, optical switch is expensive. The optical cable is capable of transmitting a large quantity of information. In practical systems, the optical cables have been more widely used than metal cables.

Now, an embodiment in which the system reliability, availability and serviceability is enhanced by a single loop which is more economical than dual-loop will be described with reference to FIG. 19.

In this embodiment, the loop of the network system is single and when a fault occurs, the faulty terminal is separated or isolated for assuring information transmission for the signal to bypass the terminal in the event of the fault.

Each terminal transmits the signal in synchronization with its own clock when the clock from the previous terminal is interrupted. Fault location can be easily conducted by transmitting the fault condition to enable the central unit to recognize that the terminal transmits the signal in response to its own clock.

If an optical cable is used, it is so arranged that the bypass operation does not involve an optical switch, but is implemented by a switch which bypasses a signal which has been converted into an electric signal from an optical signal. The opto-electric converter is adapted to be powered by both usual power source and backup power source.

Figure 19:
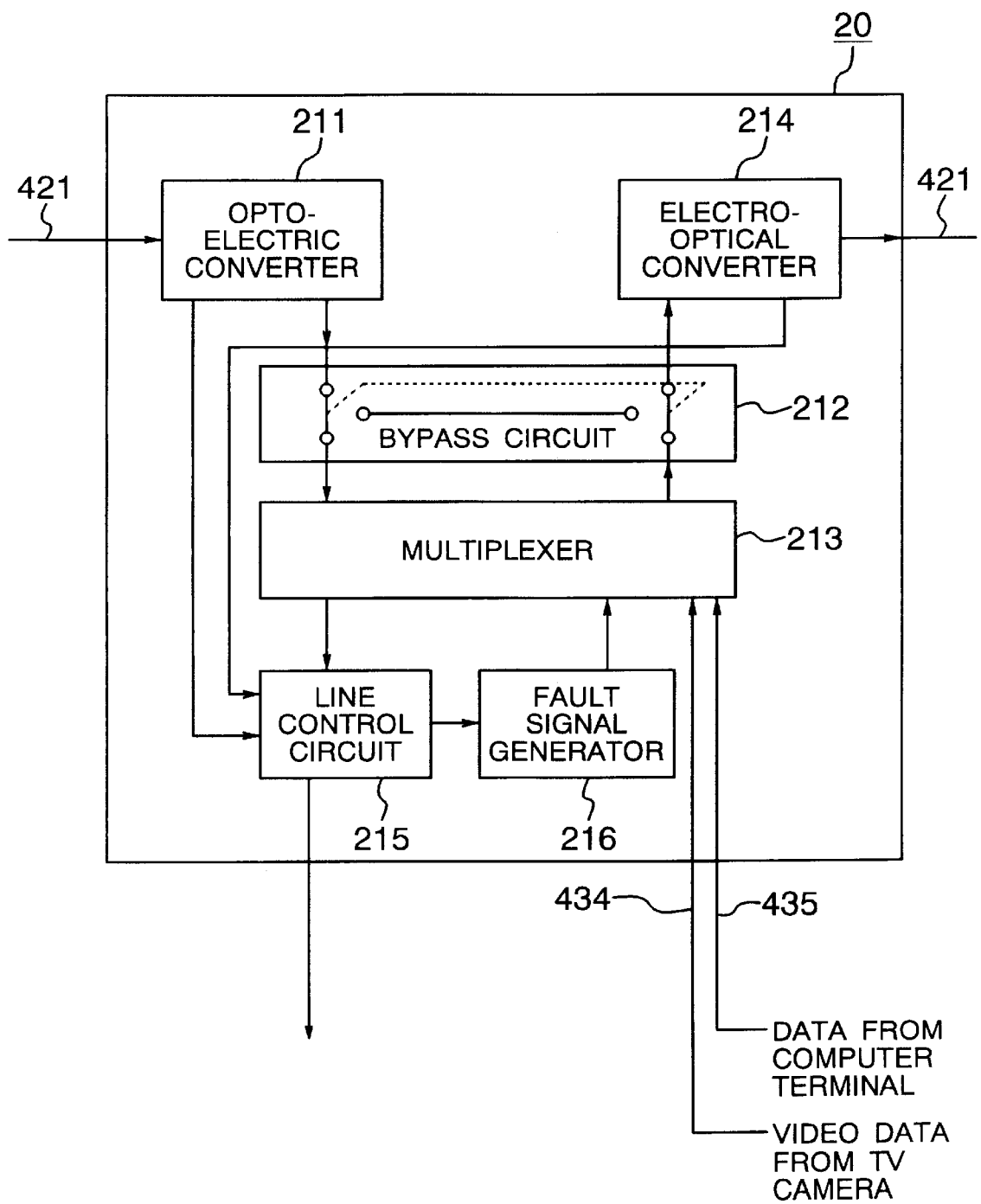
FIG. 19 is a block diagram showing a terminal of another embodiment of the present invention.

FIG. 19 is an internal block diagram showing the terminal 20 used for a digital video signal transmission network in which the present invention is embodied.

In the figure, a reference numeral 421 denotes an optical cable; 211 an opto-electric converter; 214 an electro-optical converter; 212 a bypass circuit; 213 a multiplexer; 215 a line control circuit; 216 a fault signal generator which generates a fault signal specific for each terminal. Accordingly, the central unit 21 can identify which terminal transmits this fault signal. A reference numeral 434 denotes video data from TV camera (not shown) or audio data from a microphone, recorder or the like. 435 denotes data from computer terminals or the like (hereinafter referred to as terminal-PC data) from computer terminals, etc. (not shown).

Figure 20:
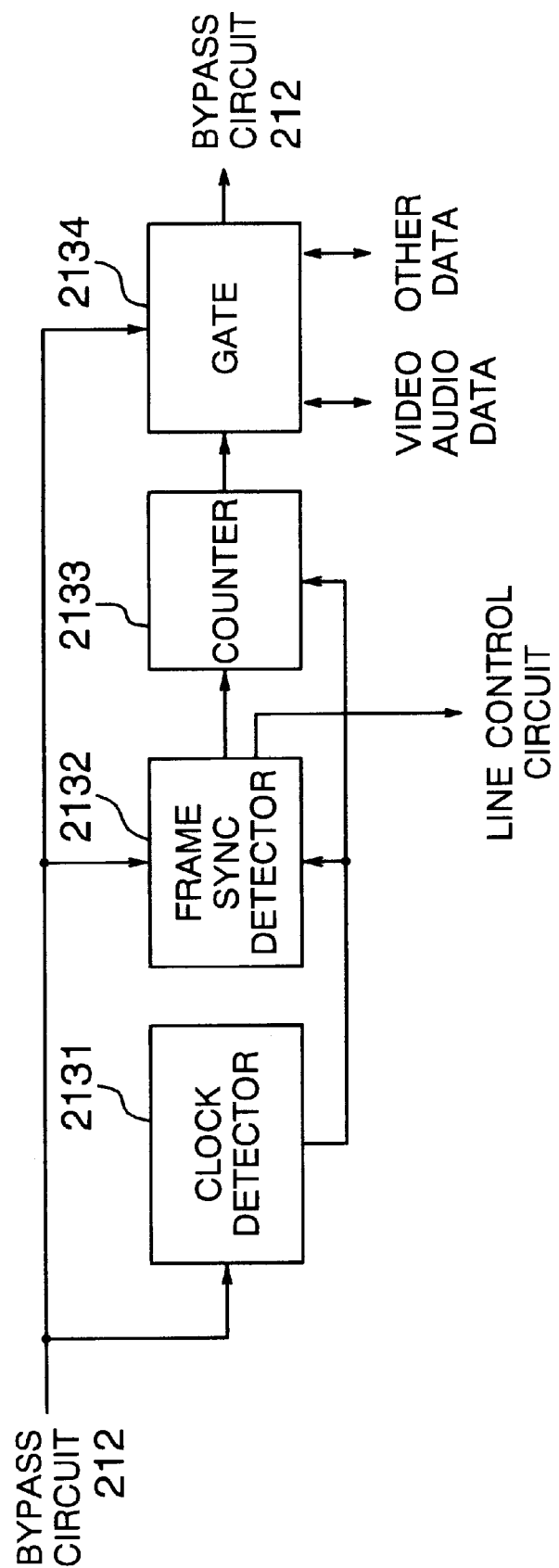
FIG. 20 is a block diagram showing a multiplexer of the terminal in FIG. 19.

FIG. 20 is a block diagram of a multiplexer 213. In the figure, a clock detector 2131 detects a clock signal from a signal input from a bypass circuit 212. The signal input from the bypass circuit 212 is sampled in synchronization with the clock signal and frame synchronization is detected by a frame sync detector 2132. If frame synchronization is not detected, an error signal is fed to the line control circuit 215. The clock is counted by a counter 2133 from the frame synchronization signal and write and read of data from and into a predetermined frame position is conducted in a gate 2134. A signal having video and audio data and other data written thereto and read therefrom at a given position thereof is output to the bypass circuit.

Figure 21:
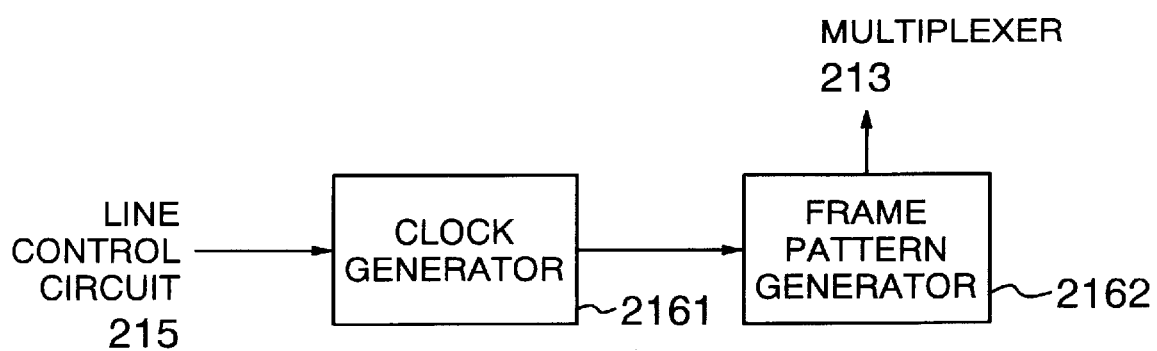
FIG. 21 is a block diagram showing a fault signal generator of the terminal in FIG. 19.

FIG. 21 is a block diagram showing a configuration of a fault signal generator 216. A clock generator 2161 is started up in response to a frame signal generating signal from the line control circuit 215. A frame pattern generator 2162 generates a frame for informing of an error condition in response to the clock from this clock generator 2161 and outputs it to the bypass circuit 212 via the multiplexer 213.

Figure 22:
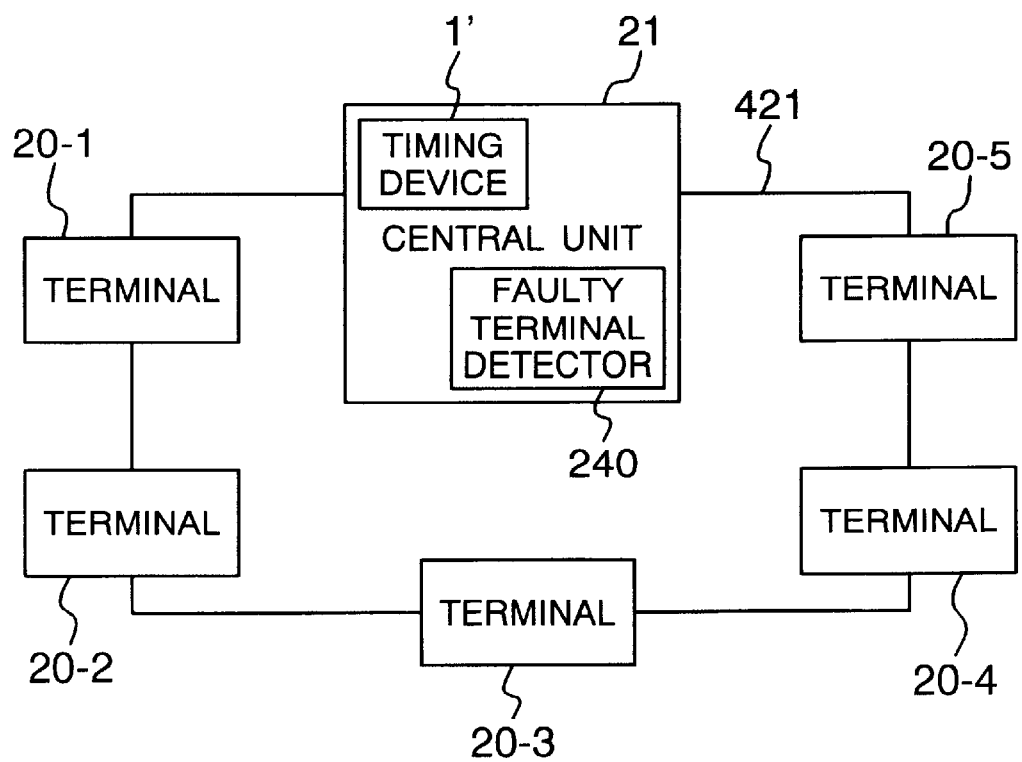
FIG. 22 is a block diagram showing the system configuration of a digital video transmission network of another embodiment of the present invention.

FIG. 22 is a block diagram showing the configuration of the whole of a digital video data transmission network of the present embodiment in which five terminals 20 (20-1 to 20-5) of FIG. 19 are incorporated therein. A reference numeral 21 denotes a central unit.

Now, operation of this network will be described.

A reference signal which is output from the central unit 21 is passed through an optical cable 421 and is input to a terminal 20-1. The central unit 21 has a timing device 1' (master repeater) having a configuration identical with that of the timing device 1 of the embodiment of FIG. 1 and outputs a reference signal (a reference pulse pattern having a frame synchronization signal, time slots for which each channel is allocated and various signals, etc.) to an optical cable 421. The central unit 21 includes a faulty terminal locating unit 240 which receives a fault signal specific to a terminal, which is generated from a fault signal generating circuit 216 in the terminal 20 when the terminal 20 is faulty and identifies which terminal generates the fault signal. The fault terminal locating unit 240 analyzes a network control data 203 shown in FIG. 23 and their terminal No. and fault content contained in a frame which is generated from a fault signal generating circuit 216 shown in FIG. 21 and carries out identification of the fault position. In accordance with this result, loop-back of a specified terminal is conducted by carrying on the network control data 203 of the frame shown in FIG. 23 a loop-back instruction from the central unit 21. The terminal 20-1 conducts insertion and extraction of video and audio data and outputs the data to next terminal via the optical cable 421. The optical signal is input to the central unit 21 from the last terminal 20-5 for conducting insertion and extraction of necessary video and audio signals.

Figure 23:
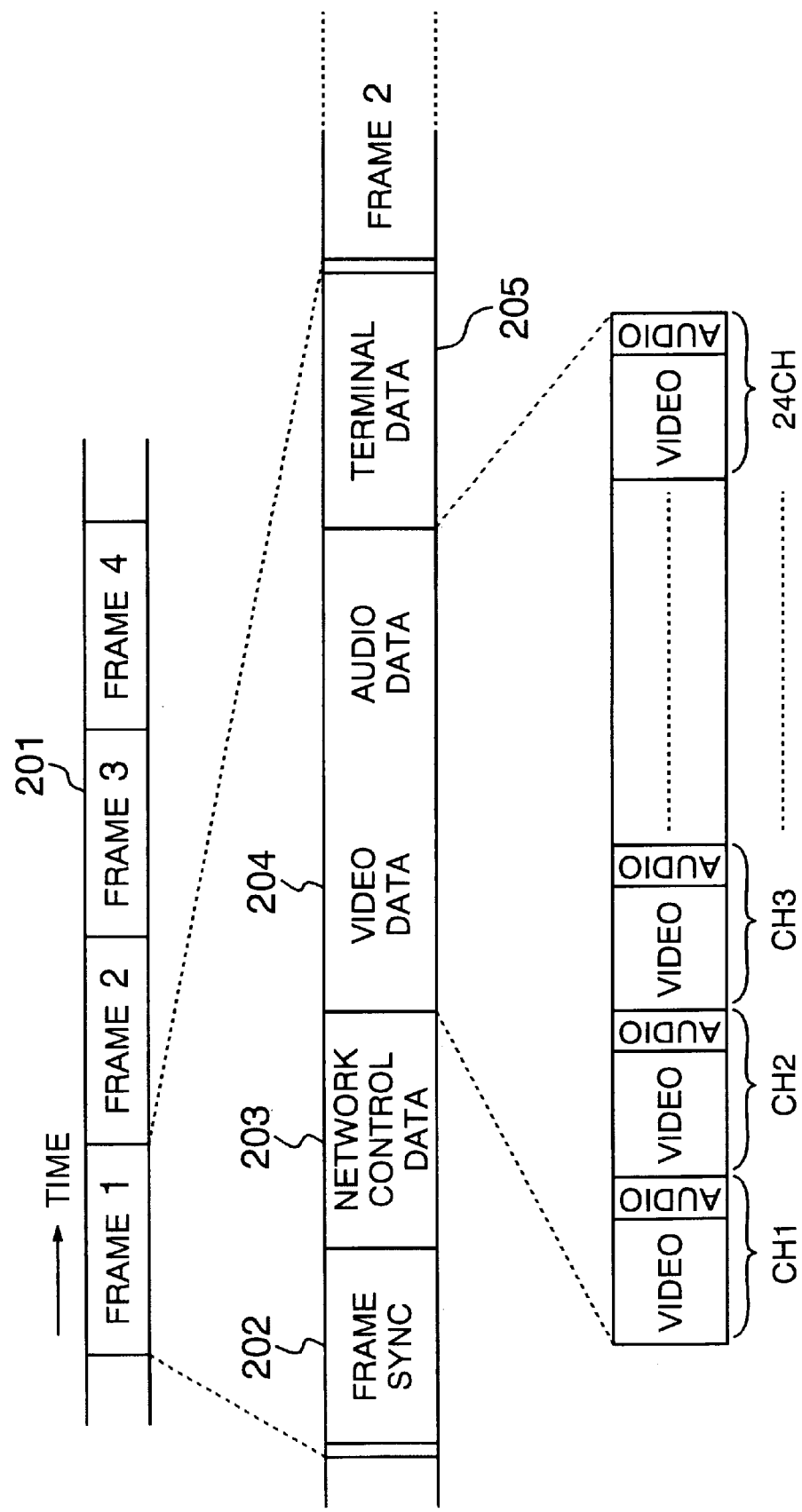
FIG. 23 is a chart showing a signal format of the digital video transmission network of the embodiment in FIG. 22.

FIG. 23 is a diagram showing a format of data 201 which is transmitted through the optical able 421 of the system.

One frame comprises a frame synchronization data 202, network control data 203, video and audio data 204, and a data from PC terminal 205. In an example shown in the figure, the video and audio data 204 has a capacity of 24 channels. The video data and audio data from a TV camera of each terminal (not shown) is allocated to vacant channel and is transmitted under control of the central unit 21.

Each terminal 20 converts data having a format of FIG. 23 which is input as an optical signal is converted into an electric signal by an opto-electric converter 211 and inputs it to the multiplexer 213 via the bypass circuit 212. The multiplexer 213 conducts insertion and extraction of data based upon the network control data 203. The inserted data is disposed in a vacant channel for the video, audio data 204. The data is passed through the bypass circuit 212 and is converted into an optical signal by the electro-optical converter 214 and is then output to next terminal via the bypass circuit 212 on a frame-to-frame basis. The line control circuit 215 conducts switching of the bypass circuit 212 and control of the fault signal generator 216 in response to a bypass instruction from the central unit 21, an optical input level signal from the opto-electric converter 211, an optical output level signal from the electro-optical converter 214 and an error detection signal which is an input electric signal from the multiplexer 213. The opto-electric converter 211, bypass circuit 212, and electro-optical converter 213 have their inputs of backup power supply circuit (not shown) so that maintenance of minimum network signal is enabled on failure of power source for their own terminal.

Figure 24:
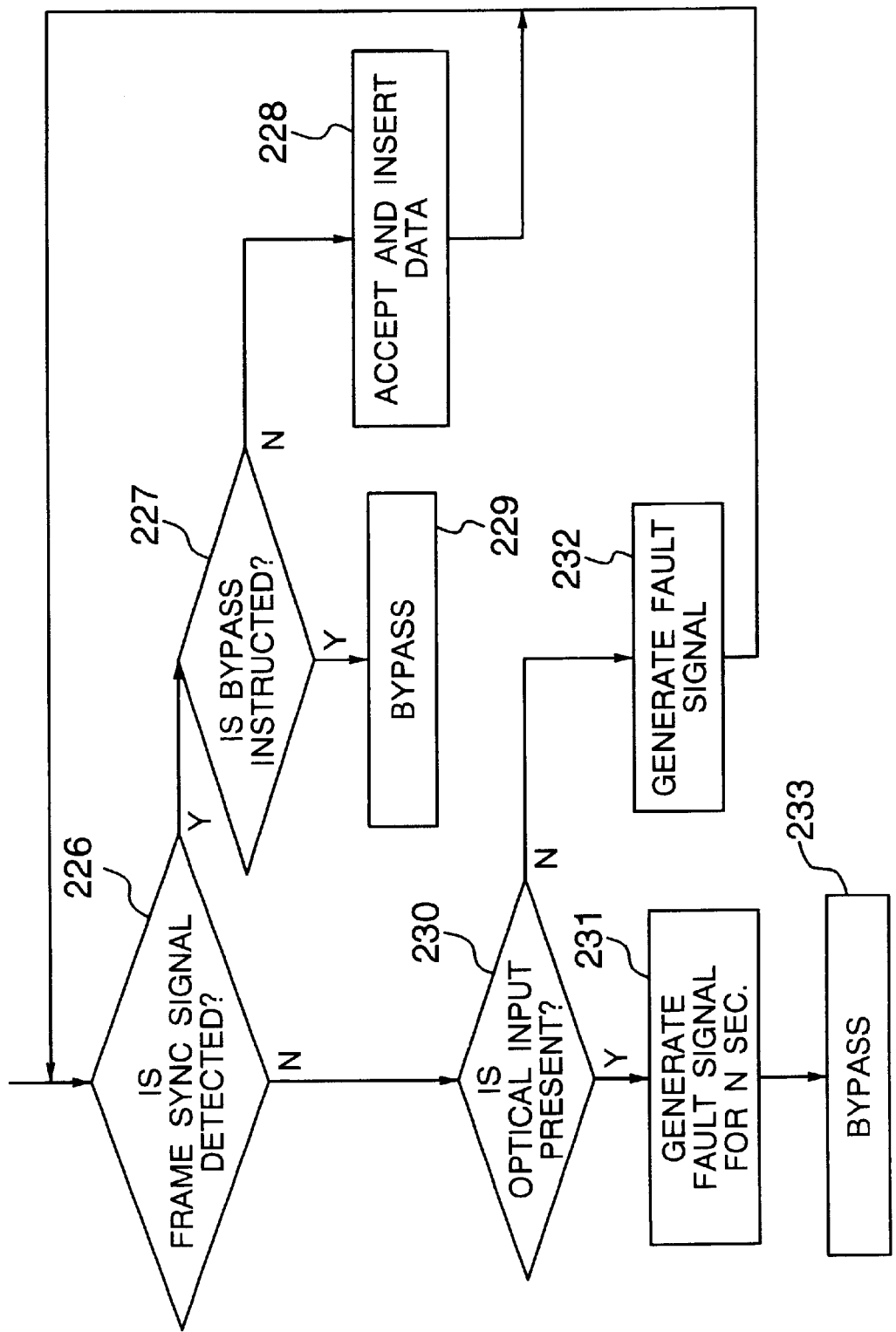
FIG. 24 is a flow chart showing the operation of the network of FIG. 22 when a fault occurs in the digital video transmission network in FIG. 22.

FIG. 24 is a flow chart for explaining the operation for responding to a fault of each terminal 20.

Now, operation for responding to typical cases will be explained with reference to flow chart of FIG. 24.

(1) In case where all operation is normal.

If all operation is normal, the line control circuit 215 determines at step (226) as to whether the frame synchronization signal (202) from the central unit 21 is accurately received and determines whether the bypass instruction is present or absent if the frame synchronization signal 202 is normal. If the frame synchronization signal 20 is normal and the bypass instruction from the central unit 21 is absent (227), normal operation such as insertion and/or extraction of data is conducted. If the bypass instruction (included in the network control data 203) is present, the bypass circuit 212 is switched to a bypass state to bypass the frame of interest.

(2) In case where the frame synchronization signal is not received (226).

If the frame synchronization signal 202 is not received at frame synchronization determination step (226), its own terminal is fault or an optical signal is interrupted. Accordingly, the line control circuit 215 determines whether an optical input is present or not (230). If the optical input is abnormal, fault signal generation is continued until normal frame synchronization signal is input (232). The fault signal is transmitted to the central unit 21 via each terminal. If the optical input is normal, transmitted data is bypassed (233) after the fault signal is generated for a predetermined period of time (231). Therefore, the fault signal is transmitted to the central unit 21 at fault signal generating step (231) before this transmission of data. The predetermined period of time for which the fault signal is transmitted (N sec.) is, for example, 1 to 20 seconds.

Fault condition can be recognized by analyzing in the central unit 21 the fault signal from the abnormal terminal or the terminal in which the abnormality is detected in such a manner.

Now, operation for typical 2 fault patterns will be described.

(1) Disconnection of Cable

If the cable between the terminals 20-1 and 20-2 is disconnected, no optical signal is input to the terminal 20-2 which in turn generates a fault signal. The terminal 20-3 generates a fault signal until the terminal 20-2 generates a fault signal in response to its won clock. When the fault signal which is generated by the terminal 20-2 in response to its own clock is input to the terminal 20-3, data on which abnormal information is carried is transmitted to next terminal 20-4 by the terminal 20-3. The central unit 21 can identify the fault position based upon this information.

(2) Failure of Electric System of Terminal

If the line control circuit 214 can recognize that the internal circuitry of its own terminal is abnormal on failure of the electric system of the terminal 20-2, it energizes the fault signal generator 216 to automatically output a fault signal for a predetermined period of time (231) and is brought into a bypass state (233). Next terminal 20-3 is brought into a state to enable a fault signal to be generated in response to its own signal when an abnormal signal is input. The next terminal 20-3 is changed into a normal operation after the terminal 20-2 conducts a bypass operation. The central unit 21 can identify the fault terminal since it can receive a fault signal from the terminal 20-2 and can maintain the network by bypass operation.

The network can be maintained as is similar to the above-mentioned operation if the bypass operation is possible in response to an instruction from the central unit based upon information sent to the central unit from next terminal even when abnormality of own terminal can not be recognized on failure of the electric system.

If the bypass operation is not possible in response to an instruction from the central unit 21 when the abnormality of its own terminal is not recognized, quick measure can be taken since identification of the terminal of interest is possible based upon information from next terminal (information representing that frame synchronization signal can not be detected).

Although optical fiber cable is used as a transmission line in the foregoing description, it may of course be possible to use usual metal cable. Although one central unit is used, a plurality of central units may be used. It is a matter of course that the number of the terminals is not limited to 5.

In the above-mentioned embodiments, maintenance of the network and identification of a fault position can be easily carried out in the event of fault of a terminal of the network or the digital transmission network which is connected in the form of loop by a metal cable or optical fiber cable.

That is, if the cable is dual-looped, cost of the cable and installation of the cable becomes expensive. The cost for them is never necessary in the present embodiments.

Since necessity for use of optical switches for switching cables which will be necessary if an optical cable is used as a transmission cable is omitted, the structure of the system can be simplified and its economical advantage is large.

The reliability and serviceability of the system can be enhanced even single loop is used, the system of the present embodiment is more simple in structure and more economical than dual-looped system.

What is claimed is:

1. A digital transmission network, comprising:
   a plurality of transmission terminals for converting a video signal into a digital signal and transmitting it as a transmission signal;
   at least one receiving terminal for receiving said digital signal from said transmission terminals and for converting it into an original video signal;
   a transmission line for connecting said transmission terminals with said receiving terminal in the form of loop;
   a timing device on said transmission line for generating a frame signal having a predetermined number time slots, said frame signal is transmitted through said transmission line in one direction; and
   an allocation control circuit for allocating said signal transmitted from said transmission terminals to any of said plurality of time slots, wherein said plurality of terminals includes means for converting said digital signal into an optical signal and for transmitting said optical signal;

at least one central unit for receiving said optical signal from said terminals and for converting said optical signal into an original video information;

wherein said transmission line includes an optical transmission line for connecting said terminals with said central unit in dual-loop; said optical line including optical fiber cables of working line and backup line; and said frame signal having a predetermined number of time slots is transmitted as an optical signal on said working line or said backup line in one direction, said optical signal including an optical signal from said terminal;

said digital signal from said terminals being allocated to any of said time slots and transmitted, each of said plurality of terminals comprising:
- two opto-electric converters for converting optical signals received from the optical fiber cables of said working line and backup line into electric signals,
- two electro-optical converters for converting said electric signals into optical signals and for transmitting it to the optical fiber cables of said working line and said backup line,
- a path switch for switching the connection between said two opto-electric converters and said two electro-optical converters in response to a control signal,
- a multiplexer for inserting or extracting digital data including video information to or from a predetermined time slot of an electric signal which is switched by said path switch and input, and
- a path control circuit for controlling said path switch in response to a control from said central unit, an optical signal level detection signal from said opto-electric converter and electro-optical converter and an error detection signal from said multiplexer.

2. A digital transmission network as defined in claim 1 in which said digital signal further includes audio information.

3. A transmitting method in a digital transmission network according to claim 1 comprising the step of:

transmitting a control signal for loop-back to said all terminals from said central unit to bring said all terminals into a state enabling data to be input from the optical fiber cable of the backup line.

4. A transmitting method as defined in claim 3 further comprising after bringing all of terminals into a state enabling data to be input from the optical fiber cable of the backup line, the steps of transmitting a control signal for sequentially returning said terminals into a state enabling data to be input from a working line in order of increasing distance to said central unit; and confirming whether said terminals are normally operating in order of increasing distance to said central unit.

5. A transmitting method as defined in claim 4 further comprising, after the step of confirming whether said terminals are normally operating in order of increasing distance to said central unit, the steps of:

transmitting a control signal of loop-back from said central unit to an abnormally operating terminal to bring the abnormally operating terminal into a state enabling data to be input to the optical fiber cable of the backup line if the abnormally operating terminal is confirmed;

determining that the optical fiber cable which is connected to the output of the abnormally operating terminal is disconnected if the normal operation is confirmed; and determining that the abnormally operating terminal is faulty if abnormal operation is confirmed.

\* \* \* \* \*